United States Patent [19]
Yamamoto et al.

[11] Patent Number: 5,675,699
[45] Date of Patent: Oct. 7, 1997

[54] MOTOR CONTROLLER

[75] Inventors: Munenori Yamamoto; Takayuki Kifuku; Shunichi Wada, all of Tokyo-to, Japan

[73] Assignee: Mitsubishi Denki Kabushiki Kaisha, Tokyo, Japan

[21] Appl. No.: 549,516

[22] Filed: Oct. 27, 1995

[30] Foreign Application Priority Data

Jun. 6, 1995 [JP] Japan ................................ 7-139235

[51] Int. Cl.$^6$ .......................... H02P 7/14; H02P 7/29; H02P 7/00; B62D 5/00
[52] U.S. Cl. .......................... 388/811; 318/138; 318/139; 318/599; 364/424.05
[58] Field of Search .................... 318/430–464, 318/811–815; 180/79.1, 142, 143; 364/424.02, 424.05

[56] References Cited

U.S. PATENT DOCUMENTS

| | | | |
|---|---|---|---|
| 4,621,327 | 11/1986 | Dolph et al. | 364/424 |
| 4,943,758 | 7/1990 | Tsurmiya | 318/504 |
| 4,972,133 | 11/1990 | Hirota et al. | 318/646 |
| 5,202,830 | 4/1993 | Tsurumiya et al. | 364/424.05 |
| 5,259,473 | 11/1993 | Nishimoto | 180/79.1 |
| 5,271,474 | 12/1993 | Nishimoto et al. | 180/79.1 |
| 5,303,156 | 4/1994 | Matsuoka et al. | 364/424.05 |
| 5,360,077 | 11/1994 | Nishimoto et al. | 180/79.1 |
| 5,444,622 | 8/1995 | Takeshima et al. | 364/424.05 |
| 5,504,679 | 4/1996 | Wada et al. | 364/424.05 |
| 5,530,788 | 6/1996 | Saiyima | 388/811 |

FOREIGN PATENT DOCUMENTS

| | | |
|---|---|---|
| 63-11480 | 1/1988 | Japan . |
| 2158455 | 6/1990 | Japan . |
| 399979 | 4/1991 | Japan . |

OTHER PUBLICATIONS

"Servo Technical Manual (First Volume)", 1980, pp. 118–123 and 128.

Primary Examiner—Paul Ip
Attorney, Agent, or Firm—Sughrue, Mion, Zinn, Macpeak & Seas

[57] ABSTRACT

A motor controller is provided which improves response to control inversion of a motor, and which also improves controllability and driving comfort when applied to electric power steering. In the motor controller a bridge circuit 5 is formed which includes switching elements $3a$ to $3d$ which are driven to control the motor 2 in a direction of conduction, a drive system is switched between a single-phase one-sided chopper system and either a single-phase double-sided chopper system or a double-phase double-sided chopper system based on detected states of an apparatus or the amount of control, so as to control the motor 2 with a drive system suitable for each state of the apparatus.

8 Claims, 26 Drawing Sheets

MOTOR CONTROLLER

BACKGROUND OF THE INVENTION

1. Field of the Invention

This invention relates to a motor controller and, more particularly, to a PWM (Pulse Width Modulation) drive motor controller.

2. Description of the Prior Art

Among motor controllers, there is known one for controlling a motor by connecting a bridge circuit formed of switching elements to a motor as a load and driving a pair of switching elements determined by the direction of conduction in the motor. There are three systems for driving the switching elements: single-phase one-sided chopper system, single-phase double-sided chopper system and double-phase double-sided chopper system.

A prior art motor controller has the following problems according to each drive system.

When a motor is driven by a single-phase one-sided chopper system, since there is always only one pair of switching elements for the system compared with two pairs of switching elements for a single-phase double-sided chopper system and four pairs of switching elements for a double-phase double-sided chopper system, switching loss is about half that of a single-phase double-sided chopper system and about ¼ that of a double-phase double-sided chopper system and heat generated from the switching elements is small.

As shown in FIG. 27, since the duty ratio of the switching element is almost linear to average motor application voltage, changes in average motor application voltage with respect to the duty ratio are smaller than in a single-phase double-sided chopper system and double-phase double-sided chopper system in an area where the duty ratio is 50% or more. As average motor application voltage is in proportion to a motor current, controllability in the case of applying a motor current having a duty ratio of 50% or more is good.

The relationship between motor torque Tm and motor current Ia can be represented by the following expression:

$$Tm = Kt \cdot Ia \quad (31)$$

wherein Kt is a torque constant.

For brevity's sake, when the case where a motor is driven by a negative load is taken into consideration, the relationship between motor angular acceleration $d\omega/dt$ and motor torque can be represented by the following expression:

$$Tm = Jm \cdot d\omega/dt \quad (32)$$

wherein Jm is an inertia moment of the motor.

The angular acceleration of the motor is derived from the above expressions (31) and (32) as follows.

$$dw/dt = Kt/Jm \cdot Ia \quad (33)$$

Since Jm and Kt are specific to the motor, motor angular acceleration dw/dt can be controlled solely by motor current Ia.

In this instance, in the case of driving the motor from a right direction to a left direction, for example, if energy stored in the inductance of the motor when the motor is driven in the right direction is not consumed with the resistance of the motor by a regenerative current I2 as shown in FIG. 4, an electric current will not flow in the left direction. Since the angular acceleration of the motor, shown in FIG. 24A, is directed to the right direction as shown in the expression (33) while this regenerative current I2 flows, the angular speed of the motor, shown in FIG. 24B, is not inverted and yet increases in the right direction as shown in FIG. 24. Therefore, when control to repeat inversion of the angular speed of the motor in right and left directions is performed, motor controllability is low.

Further, as shown in FIG. 27, since changes in average motor application voltage with respect to duty ratio are larger than those of a single-phase double-sided chopper system when the duty ratio is 50% or less, controllability of a motor current is low. As the result, when a small current is caused to flow in the motor, hunting is liable to occur in the current.

As disclosed in the document "Servo Technical Manual (First Volume)", when the direction of conduction in the motor is to be inverted, a dead zone must be provided to switch off all the switching elements in order to prevent a short circuit in a bridge circuit caused by the difference of delay in switching on and off the switching elements. Therefore, there is a problem that a ripple is generated in the torque of the motor upon inversion of the direction of conduction.

Meanwhile, since there are two pairs of switching elements to be always switched in a single-phase double-sided chopper system, switching loss is about half that of a double-phase double-sided chopper system and heat generated by the switching elements is small.

As shown in FIG. 27, since changes in average motor application voltage with respect to duty ratio are smaller than those of the single-phase one-side chopper system when the duty ratio is 50% or less, controllability of a motor current is high.

In the case of driving the motor from a right direction to a left direction, for example, as shown in FIG. 5, electricity can be applied in a left direction immediately because energy stored in the inductance of the motor when the motor is driven in a right direction is regenerated in a power supply by the regenerative current I4 immediately. Therefore, the motor angular acceleration of the motor, shown in FIG. 25A, is generated in a left direction immediately and, as shown in FIG. 25B, the angular speed of the motor is inverted swiftly. Therefore, when control to repeat inversion of angular speed in right and left directions is performed, motor controllability is higher than that of a single-phase one-sided chopper system.

However, switching loss is about double that of a single-phase one-sided chopper system and heat generated by the switching elements is large.

Further, as shown in FIG. 27, since changes in average motor application voltage with respect to duty ratio are large compared with those of a single-phase one-sided chopper system when the duty ratio is 50% or more, controllability of a motor current is low. Particularly in the case of digital control of a motor current, resolution of average motor application voltage may run short at a duty ratio of 50% or more. Therefore, when a large current is caused to flow in the motor, hunting is liable to occur in the current.

Like a single-phase one-sided chopper system, as a dead zone for turning off all the switching elements must be provided, there is a problem that a ripple is generated in motor torque upon inversion of the direction of conduction.

Moreover, in a double-phase double-sided chopper system, in the case of driving the motor from a right direction to a left direction, electricity can be applied in a left direction immediately since energy stored in the inductance of the motor when the motor is driven in a right direction as shown in FIG. 5 is regenerated in the power supply by the regenerative current I4 immediately. Therefore, a motor angular acceleration is generated in a left direction immediately and, as shown in FIG. 25, the angular speed of the motor is inverted swiftly. Therefore, when control to repeat inversion of the angular speed in right and left directions is performed, motor controllability is higher than that of a single-phase one-sided chopper system.

As disclosed in the above document, even when a motor current target value is "0", as shown in FIG. 26B, an AC current is caused to flow in the motor. Therefore, a dead zone required for the delay of the switching elements can be eliminated as shown in FIG. 26A.

However, since there are four pairs of switching elements to be always switched, switching loss is about four times that of a single-phase one-sided chopper system and heat generated by the switching elements is large.

Further, as shown in FIG. 27, unlike the other two systems in which right and left polarities of electricity are respectively controlled with a duty ratio of 0 to 100%, the entire range of motor application voltage from the maximum value in the left direction to the maximum value in the right direction is controlled with a duty ratio of 0 to 100%. Therefore, changes in average motor application voltage with respect to duty ratio are large and motor current controllability is low. Particularly, in the case of digital control of a motor current, hunting is liable to occur in the current when a large current is caused to flow in the motor because resolution of average motor application voltage runs short.

When application of a motor controller employing a bridge circuit drive system to electric power steering is taken into consideration, the feel of steering is bad and vibration and noise generate if current controllability is low and hunting is liable to occur. Vibration and noise make a driver feel extremely uncomfortable.

When switching loss is large and heat generated by the switching elements is large, the capacity of the switching elements and the capacity of a heat sink need to be large enough to suppress heat generation from the switching elements, resulting in boosted costs and a bulky controller.

If the motor is not inverted immediately upon switching of the polarity of electricity, there will be a problem that a feeling of disorder such as an irregular torque is perceived when the steering wheel is turned back.

If a dead zone is generated upon switching of the polarity of electricity, an irregular torque is generated when the steering wheel is turned back, a feel of steering with the steering wheel located at around a neutral position during driving or so-called a center feeling is heavy so that so-called a feeling of friction is perceived. The deterioration of the center feeling makes a driver feel extremely uncomfortable while driving at a high speed.

SUMMARY OF THE INVENTION

This invention has been made to solve the above problems, and it is therefore an object of the invention to provide a motor controller which improves motor controllability and suppresses heat generation from the switching elements.

According to the present invention, there is provided a motor controller which includes a motor connected as a load to a bridge circuit formed of four switching elements, a detection unit for detecting various states of an apparatus, and a control unit for controlling the motor to a desired motor current by obtaining the amount of control based on the detection result of the detection unit and by driving one pair or two pairs of the switching elements of the bridge circuit based on the amount of control, wherein the above control unit comprises drive system switching unit for switching a drive system between a single-phase double-sided chopper system in which a pair of switching elements in a desired direction of conduction are driven by a PWM drive signal and the other pair of switching elements are turned off when the detection result or the amount of control falls below a predetermined value and a single-phase one-sided chopper system in which one of a pair of switching elements in a desired direction of conduction is driven by a PWM drive signal, the other of the pair of switching elements is turned on continuously, and the other pair of switching elements are turned off when the detection result or the amount of control exceeds the predetermined value.

There is also provided a motor controller which includes a motor connected as a load to a bridge circuit formed of four switching elements, a detection unit for detecting various states of an apparatus, and a control unit for controlling the motor to a desired motor current by obtaining the amount of control based on the detection result of the detection unit and by driving one pair or two pairs of the switching elements of the bridge circuit based on the amount of control, wherein the above control means includes a drive system switching unit for switching a drive system between a double-phase double-sided chopper system in which a pair of switching elements in a desired direction of conduction are driven by a PWM drive signal and the other pair of switching elements are driven by an inverted signal of the drive signal when the detection result or the amount of control falls below a predetermined value and a single-phase one-sided chopper system in which one of a pair of switching elements in a desired direction of conduction is driven by a PWM drive signal, the other of the pair of switching elements is turned on continuously and the other pair of switching elements are turned off when the detection result or the above amount of control exceeds the predetermined value.

Also provided is a motor controller which includes a motor connected as a load to a bridge circuit formed of four switching elements, a detection unit for detecting various states of an apparatus, and a control unit for controlling the motor to a desired motor current by obtaining the amount of control based on the detection result of the detection unit and by driving one pair or two pairs of the switching elements of the bridge circuit based on the amount of control, wherein the above control unit includes a drive system switching unit for switching a drive system among a double-phase double-sided chopper system in which a pair of switching elements in a desired direction of conduction are driven by a PWM drive signal and the other pair of switching elements are driven by an inverted signal of the drive signal when the detection result or the amount of control falls below a first predetermined valued a single-phase double-sided chopper system in which one of a pair of switching elements in a desired direction of conduction is driven by a PWM drive signal and the other pair of switching elements are turned off when the detection result or the amount of control exceeds the first predetermined value or falls below a second predetermined value greater than the first predetermined value, and a single-phase one-sided chopper system in which one of a pair of switching elements in a desired direction of conduction is driven by a PWM drive signal and the other of the pair of switching elements is turned on continuously and the other pair of switching elements are turned off when the detection result or the above amount of control exceeds the second predetermined value.

A hysteresis component is provided to the drive system switching condition.

When the drive system is to be switched, a predetermined time period must elapse since the time when the drive system was switched previously.

Gains for motor control are changed when the drive system of the bridge circuit is to be switched.

The amount of control is at least integrally controlled and an integral term is initialized at the time of switching the drive system of the bridge circuit.

An initial value of duty ratio for driving switching elements is set at the time of switching the drive system of the bridge circuit.

It is determined whether or not the result of detection by detection unit or the amount of control calculated by the control unit falls below a predetermined value, in what state the motor is driven is estimated based on the result of the decision, and drive system is switched between a single-phase double-sided chopper system and single-phase one-sided chopper system according to the estimated state so that the motor is controlled with drive system suitable to the estimated state.

It is also determined whether or not the result of detection by detection unit or the amount of control calculated by the control unit falls below a predetermined value, in what state the motor is driven is estimated based on the result of the decision, drive system is switched between a double-phase double-sided chopper system and single-phase one-sided chopper system according to the estimated state so that the motor is controlled with drive system suitable to the estimated state.

It is determined whether or not the result of detection by detection unit or the amount of control calculated by the control unit falls below a predetermined value, in what state the motor is drive is estimated based on the result of the decision, drive system is switched among a double-phase double-sided chopper system, single-phase double-sided chopper system and single-phase one-sided chopper system according to the estimated state so that the motor is controlled with drive system suitable to the estimated state.

A hysteresis component is provided to the drive system switching condition to prevent frequent switching of drive system.

A drive system is switched only when a predetermined time period elapses since the time when drive system was switched previously to prevent frequent switching of drive system.

Gains for motor control are changed upon switching of drive system so that the motor is controlled smoothly by minimizing variations in the amount of control upon switching.

An integral term is initialized upon switching of drive system so that the motor is controlled smoothly by minimizing variations in the amount of control upon switching.

An initial value of duty ratio is set upon switching of drive system so that the motor is controlled smoothly by minimizing variations in the amount of control upon switching.

The above objects, features and advantages of the invention will become more apparent from the following description when taken in conjunction with the accompanying drawings.

DESCRIPTION OF THE PREFERRED EMBODIMENT

Preferred Embodiments of the invention are described with reference to the accompanying drawings.

Embodiment 1

Figure 1:
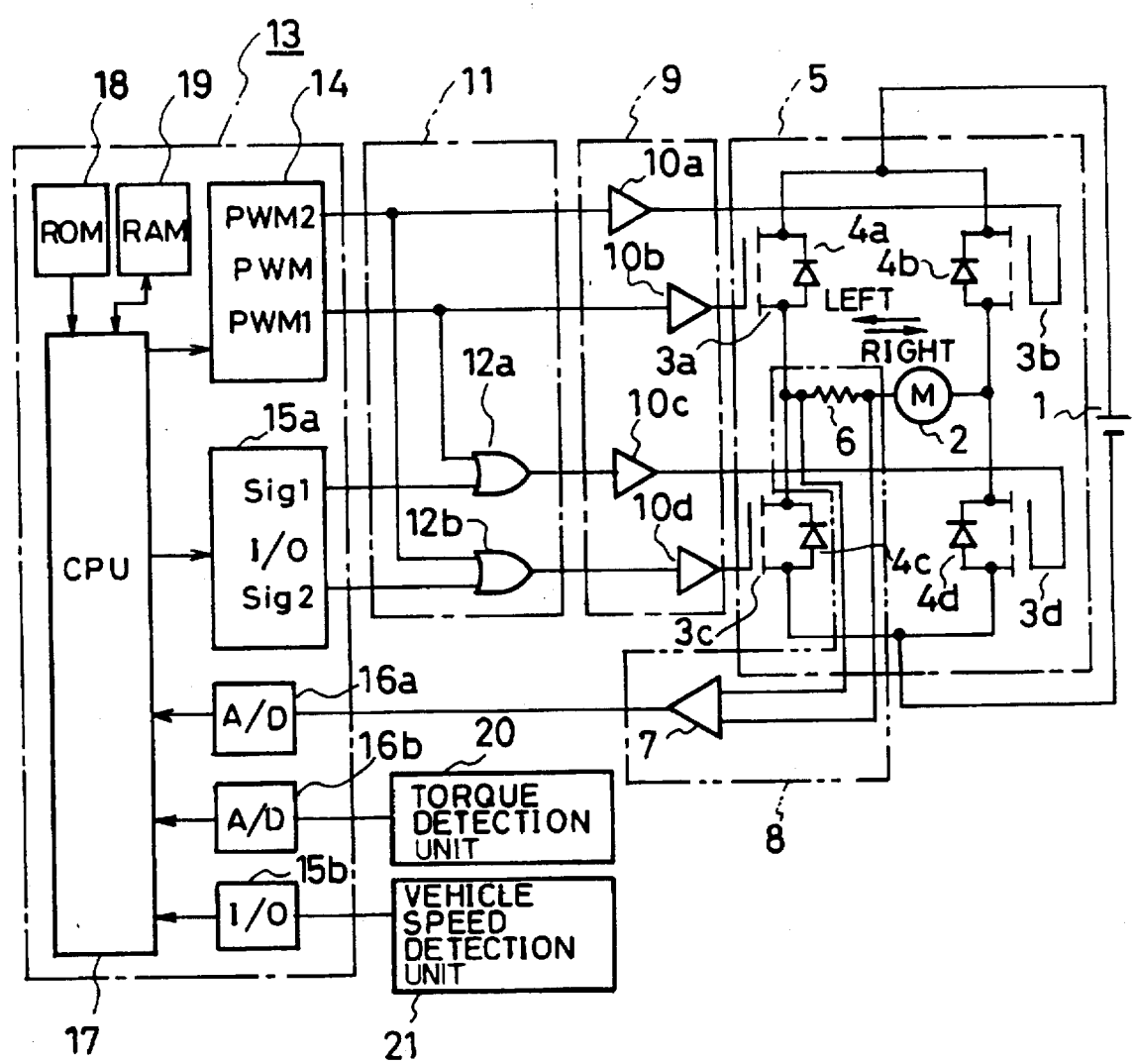
FIG. 1 is a diagram showing the configuration of Embodiment 1 of the present invention.

FIG. 1 is a structural diagram of a motor controller for controlling a motor by using a single-phase double-sided chopper system when a motor current target value falls below a predetermined value and by switching to a single-phase one-sided chopper system when the target value exceeds the predetermined value when it is applied to the power steering of a vehicle. In this FIG. 1, reference numeral 1 represents a battery loaded on a vehicle as a DC power supply, 2 a motor to which electric power is supplied from the battery 1, 3a to 3d switching elements, 4a to 4d flywheel diodes connected in anti-parallel to the switching elements 3a to 3d, and 5 a bridge circuit constituted by the switching elements 3a to 3d and connected to the motor 2 as a load. Numeral 8 indicates a current detection unit for detecting a motor current, which consists of a current detection resistor 6 and an amplifier 7 connected in series to the motor 2. Numeral 9 represents a switching element drive circuit for driving the switching elements 3a to 3d, which consists of switching element drivers 10a to 10d. Numeral 11 represents a drive system switching unit having OR gates 12a and 12b, for switching the drive system of the bridge circuit 5 in response to drive system switching signals Sig1 and Sig2.

Figure 2:
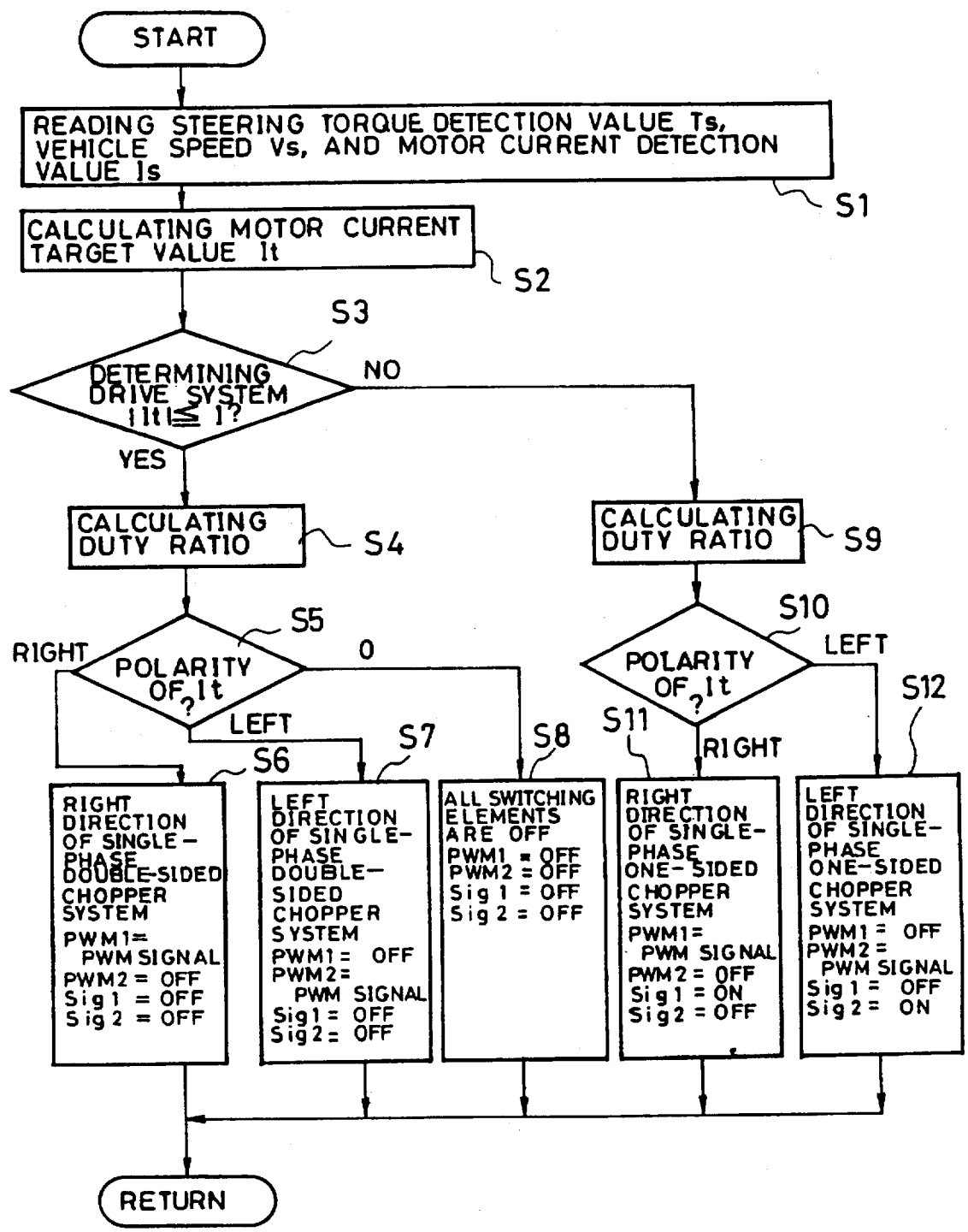
FIG. 2 is a flow chart showing the operation of Embodiment 1.

Numeral 13 represents control means which comprises a PWM modulator 14 for generating PWM signals PWM1 and PWM2 for driving the switching elements 3a to 3d, an input/output port 15a for generating drive system switching signals Sig1 and Sig2, an input/output port 15b for receiving a vehicle speed signal from a vehicle detection unit 21, an A/D converter 16a for A/D converting a motor current detection value from the motor current detection unit 8, an A/D converter 16b for A/D converting a steering torque detection value of a steering wheel detected by a torque detection unit 20, and a microcomputer (CPU) 17 for carrying out a preset routine as shown in FIG. 2 based on detected values such as a vehicle speed from the vehicle detection unit 21, a motor current detection value from the motor current detection unit 8, and a steering torque detection value from the torque detection unit 20, in conjunction with a ROM 18 for storing a program and a RAM 19 for temporarily storing data.

Figure 3:
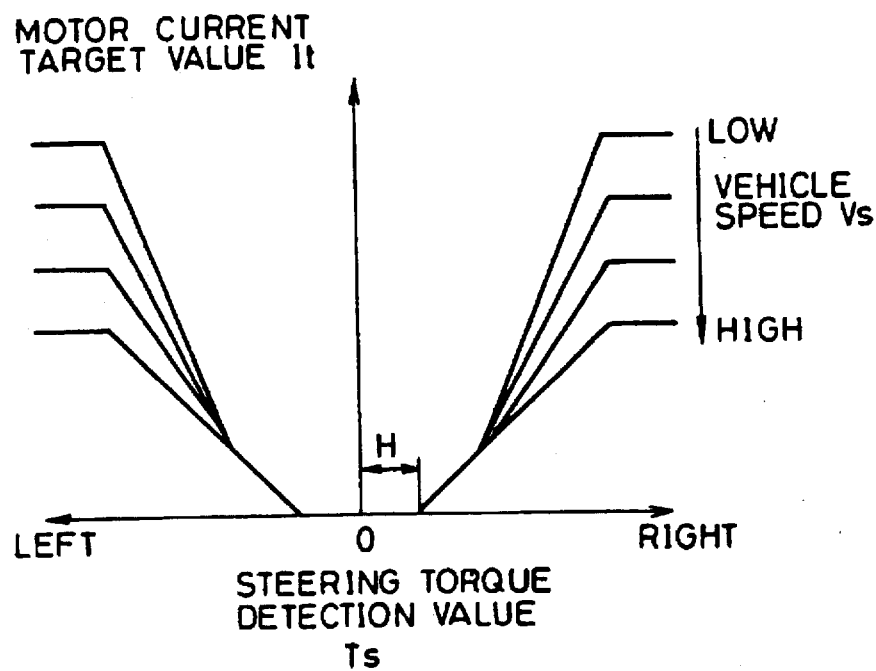
FIG. 3($a$–$b$) is a diagram explaining the operation of Embodiment 1.
Figure 3:
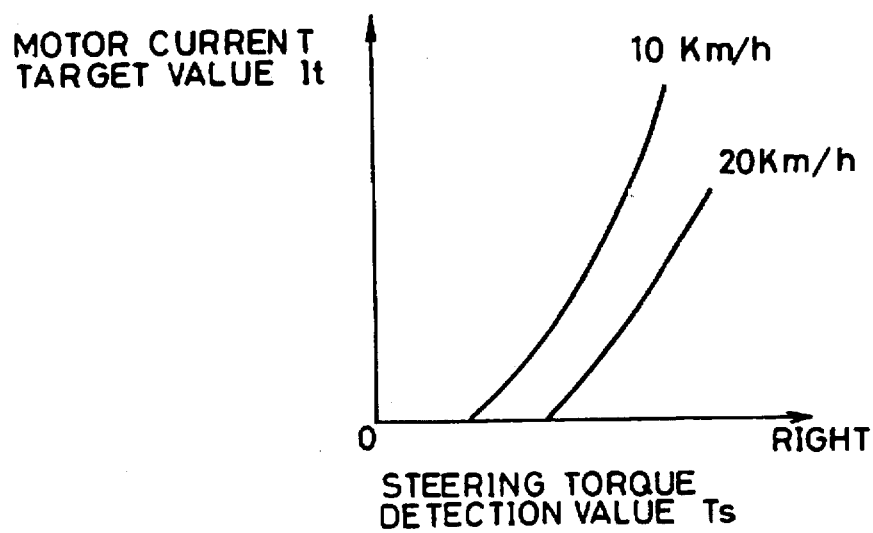
Figure 6:
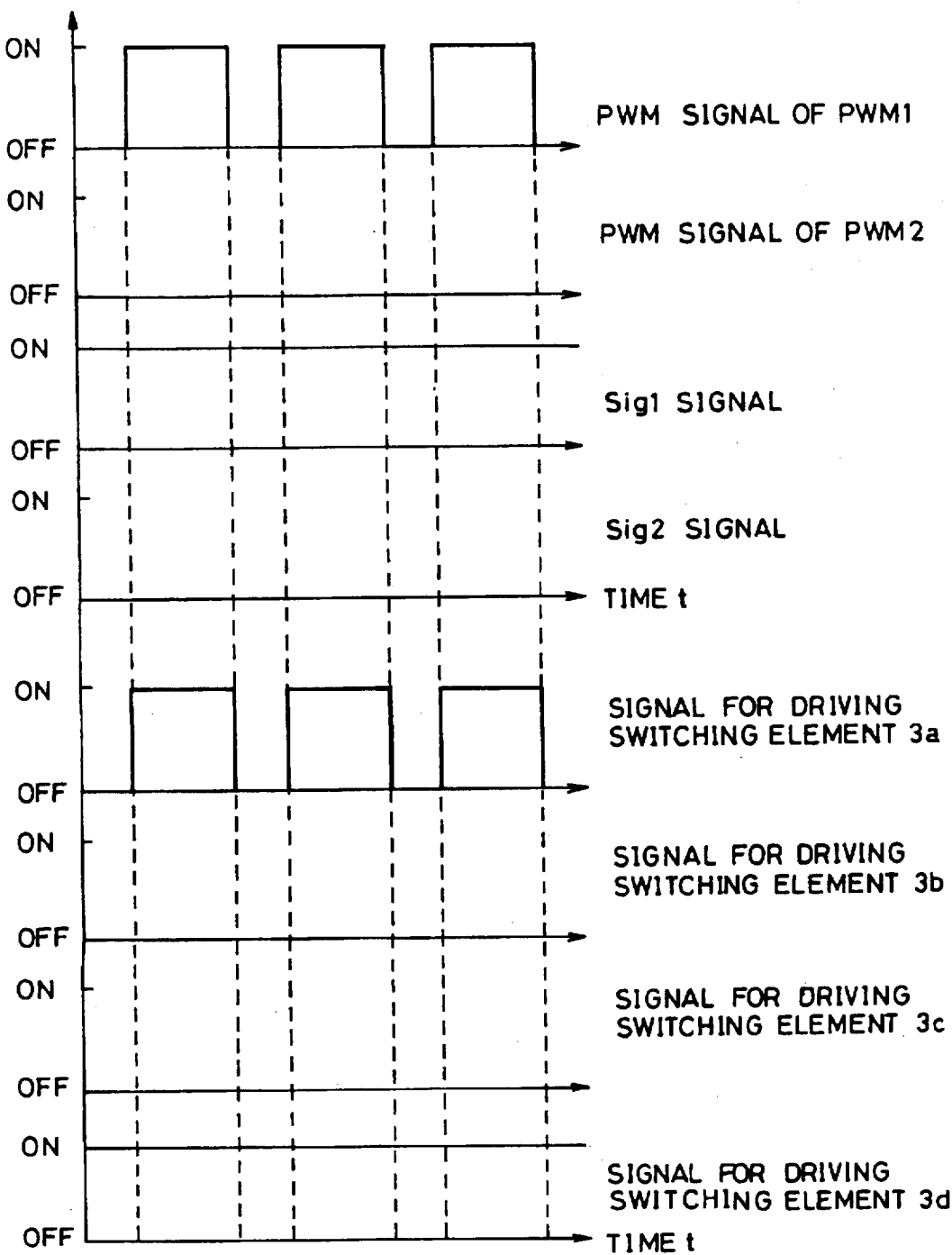
FIG. 6 is a timing chart explaining the operation of Embodiment 1.
Figure 7:
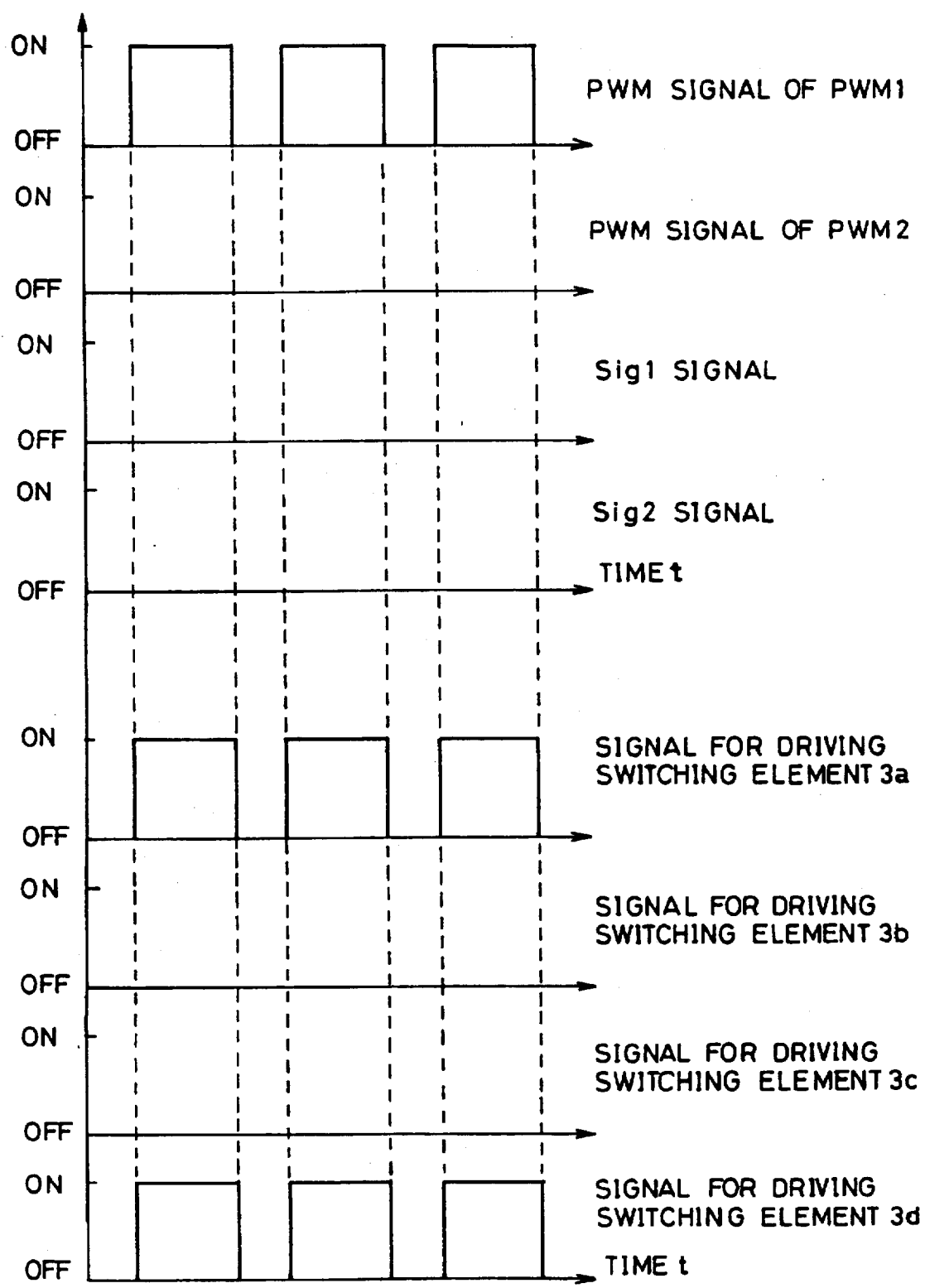
FIG. 7 is a timing chart explaining the operation of Embodiment 1.

A description is subsequently given of the operation of this Embodiment 1 with reference to a flow chart shown in FIG. 2. In step S1, a steering torque detection value Ts, a vehicle speed Vs and a motor current detection value Is are first read. In step S2, a motor current target value It is calculated from the steering torque detection value Ts and the vehicle speed Vs based on the relationship of motor current target value It with respect to steering torque detection value Ts and vehicle speed Vs as shown in FIG. 3(A). In step S3, it is determined whether or not an absolute value of the motor current target value It calculated in step S2 falls below a predetermined value I. If the absolute value of the motor current target value It falls below the predetermined value I, the routine proceeds to step S4 to perform PID (Proportional Plus Integral Plus Derivative) calculation based on the difference between the motor current detection value Is and the motor current target value It in order to obtain a duty ratio. In the subsequent step S5, the direction of conduction in the motor 2 is determined from the polarity of the motor current target value It (right or left). If the direction of conduction in the motor 2 is right, the routine proceeds to step S6 to output drive signals as shown in FIG. 7 (PWM1=PWM signal, PWM2=OFF, Sig1=OFF, Sig2=OFF) for a right direction of a single-phase double-sided chopper system to drive switching elements 3a-3d as shown in FIG. 7. If the direction of conduction in the motor 2 is left, the routine proceeds to step S7 to output drive signals (PWM1=OFF, PWM2=PWM signal, Sig1=OFF, Sig2=OFF) for a left direction of a single-phase double-sided chopper system. Only when the motor current target value It is "0", the routine proceeds to step S8 to turn off all the drive signals (PWM1=PWM2=Sig1=Sig 2=OFF). Meanwhile, if the absolute value of the motor current target value It does not fall below the predetermined value I in step S3, PID calculation is performed based on the difference between the motor current detection value Is and the motor current target value It in order to obtain a duty ratio in step S9. In the subsequent step S10, a direction of conduction in the motor 2 is determined from the polarity of the motor current target value It. If the direction is right, the routine proceeds to step S11 to output drive signals as shown in FIG. 6 (PWM1=PWM signal, PWM2=OFF, Sig1=ON, Sig1=OFF) for a right direction of a single-phase one-sided chopper system to drive switching elements 3a-3d as shown in FIG. 6. If the direction is left, the routine proceeds to step S12 to output drive signals (PWM1=OFF, PWM2=PWM signal, Sig1=OFF, Sig2=ON) for a left direction of a single-phase one-sided chopper system. This process is repeated to control the motor 2.

In FIG. 3(A), although the motor current target value It is set to "0" until the steering torque detection value Ts becomes a predetermined value in both right and left directions from "0", a width H for setting the motor current target value It to "0" is determined by what characteristic is desired for a feel of driving. In FIG. 3(A), vehicle speed Vs is divided into four levels to cover low to high speeds. The number of vehicle speed levels is not limited to four, but vehicle speed may be divided every 10 km per hour. Dividing lines separate at points of the steering torque detection value Ts a little away in both right and left directions from a point where both the steering torque detection value Ts and the motor current target value It are "0", but may be set to separate at a point where both the steering torque detection value Ts and the motor current target value It are "0".

As shown in FIG. 3(B), the relationship between steering torque detection value Ts and motor current target value It at each vehicle speed level may be represented by a curve. In the case of a vehicle speed whose data is not stored in the ROM of the microcomputer (other than 10 km/h and 20 km/h in FIG. 3(B)), a motor current target value It is calculated from the following expression:

[expression 1]
$$It = \frac{V_S - V_L}{V_H - V_L}(I_H - I_L) + I_L \qquad (1)$$

wherein $V_S$ is a vehicle speed, $V_H$ is the closest vehicle speed that satisfies $V_H \geq V_S$ and whose relational data with steering torque detection value Ts and motor current target value It is stored in the ROM of the microcomputer, $I_H$ is a motor current target value at a vehicle speed of $V_H$, $V_L$ is the closest vehicle speed that satisfies $V_L \leq V_S$ and whose relational data with steering torque detection value Ts and motor current detection value It is stored in the ROM of the microcomputer, and $I_L$ is a motor current target value at a speed vehicle of $V_L$.

For instance, the motor current target value It at a vehicle speed of 16 km/h is obtained from the above expression (1) when $I_{20}$ is a motor current target value at a vehicle speed of 20 km/h and $I_{10}$ is a motor current target value at a vehicle speed of 10 km/h.

That is,

[expression 2]
$$It = \frac{16-10}{20-10}(I_{20} - I_{10}) + I_{10} \qquad (2)$$

Figure 5:
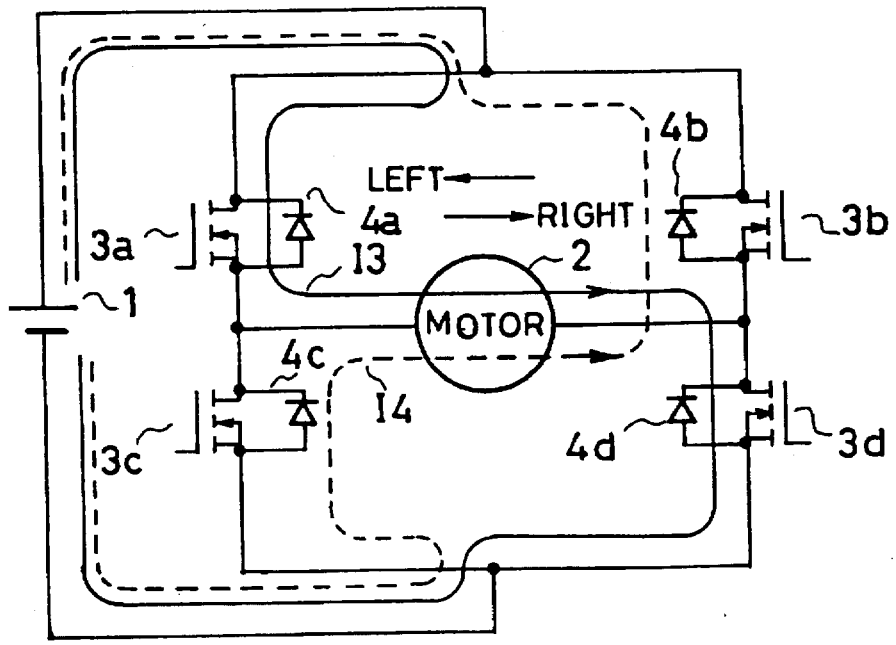
FIG. 5 is a diagram explaining the operation of Embodiment 1.

With reference to FIG. 5, the route of a motor current when the bridge circuit 5 is driven by a single-phase double-sided chopper system is described. If the switching elements 3a and 3d are on and the switching elements 3b and 3c are off, an electric current takes a route indicated by I3, from the DC power supply 1 to the switching element 3a, the motor 2, the switching element 3d and the DC power supply 1. If all the switching elements 3a to 3d are off, an electric current takes a route indicated by I4, from the DC power supply 1 to the flywheel diode 4c, the motor 2, the flywheel diode 4b and the DC power supply 1.

At this point, since the regenerative current I4 flows into the DC power supply 1, the motor 2 can be driven in the opposite direction immediately in the case of inverting the motor 2. That is, when the motor current target value It falls below the predetermined value I, that is, the motor 2 is inverted frequently, a single-phase double-sided chopper system is employed to smoothen steering. Since a large current is not caused to flow in the motor 2, heat generation does not cause a problem even when there are two pairs of switching elements to be always switched.

Figure 4:
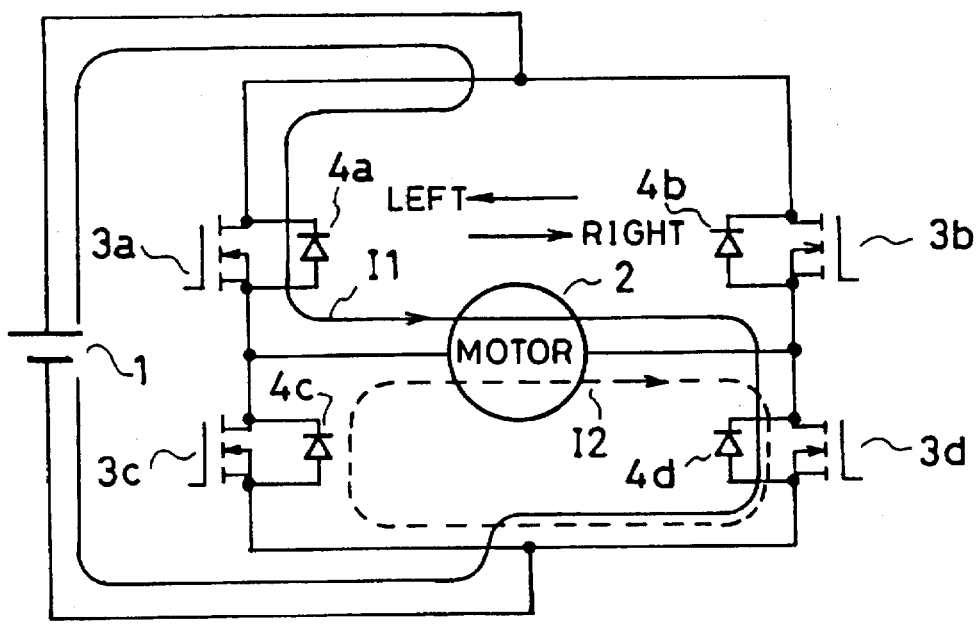
FIG. 4 is a diagram explaining the operation of Embodiment 1.

Referring to FIG. 4, the route of an electric current in the motor when the bridge circuit 5 is driven by a single-phase one-sided chopper system is described. When the switching elements 3a and 3d are on and the switching elements 3b and 3c are off, an electric current takes a route indicated by I1, from the DC power supply 1 to the switching element 3a, the motor 2, the switching element 3d and the DC power supply 1. When the switching elements 3a, 3b and 3c are off and the switching element 3d is on, an electric current takes a route indicated by I2, from the motor 2 to the switching element 3d and the flywheel diode 4c.

At this point, the regenerative current I2 continues to flow until it is consumed with the resistance of the motor and the motor is not inverted until the regenerative current stops flowing. However, when the motor current target value It exceeds the predetermined value I, a driver continues to turn the steering wheel to one direction and a large current flows in the motor 2. Therefore, when it is desired to invert the motor 2, the problem that the motor is not inverted immediately is not encountered. Since there is only one pair of switching elements to be always switched, heat generation from the switching elements does not cause a problem.

In this way, if a single-phase double-sided chopper system that provides good controllability of an extremely small current in spite of poor controllability of a large current and large switching loss is employed only when an extremely small current at which the motor current target value It falls below the predetermined value I is caused to flow, a good feel of steering can be obtained and heat generation from the switching elements causes no problem.

If a single-phase one-sided chopper system which provides good controllability of a large current and small switching loss in spite of poor controllability of an extremely small current is employed only when a large current above the predetermined value I is caused to flow, noise and vibration caused by hunting of a current can be controlled and heat generation from the switching elements can be suppressed.

Embodiment 2

Figure 8:
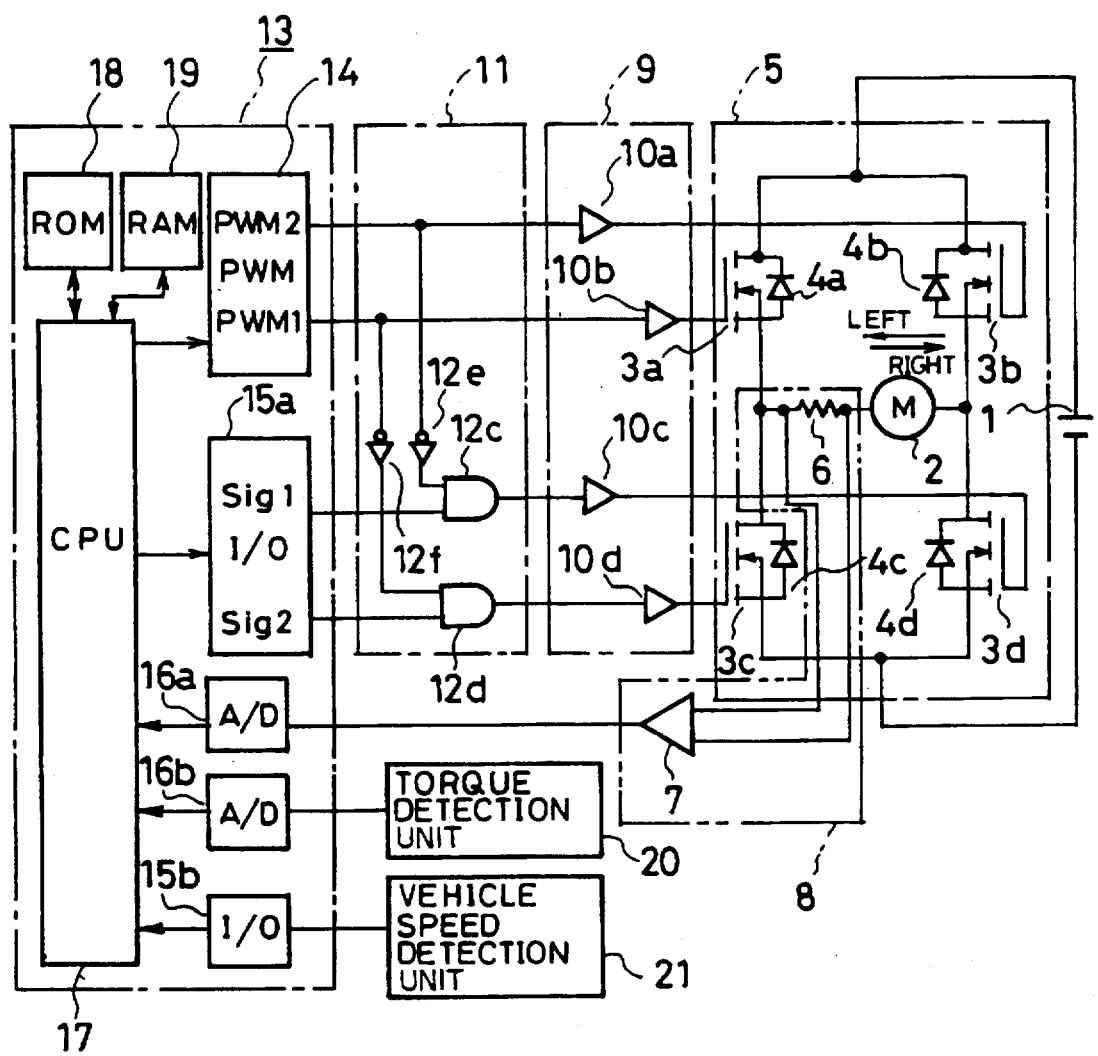
FIG. 8 is a diagram showing the configuration of Embodiment 2 of the present invention.

In the above Embodiment 1, the motor 2 is controlled by switching between a single-phase one-sided chopper system and single-phase double-sided chopper system according to the size of the motor current target value It. In this Embodiment 2, the motor 2 is controlled by switching between a single-phase one-sided chopper system and double-phase double-sided chopper system according to the size of the motor current target value It. The configuration of the motor controller of this Embodiment 2 is shown in FIG. 8. The controller of Embodiment 2 has the same configuration as that of Embodiment 1 shown in FIG. 1 except that the drive system switching unit 11 is constituted by AND gates 12c and 12d and NOT gates 12e and 12f.

Figure 9:
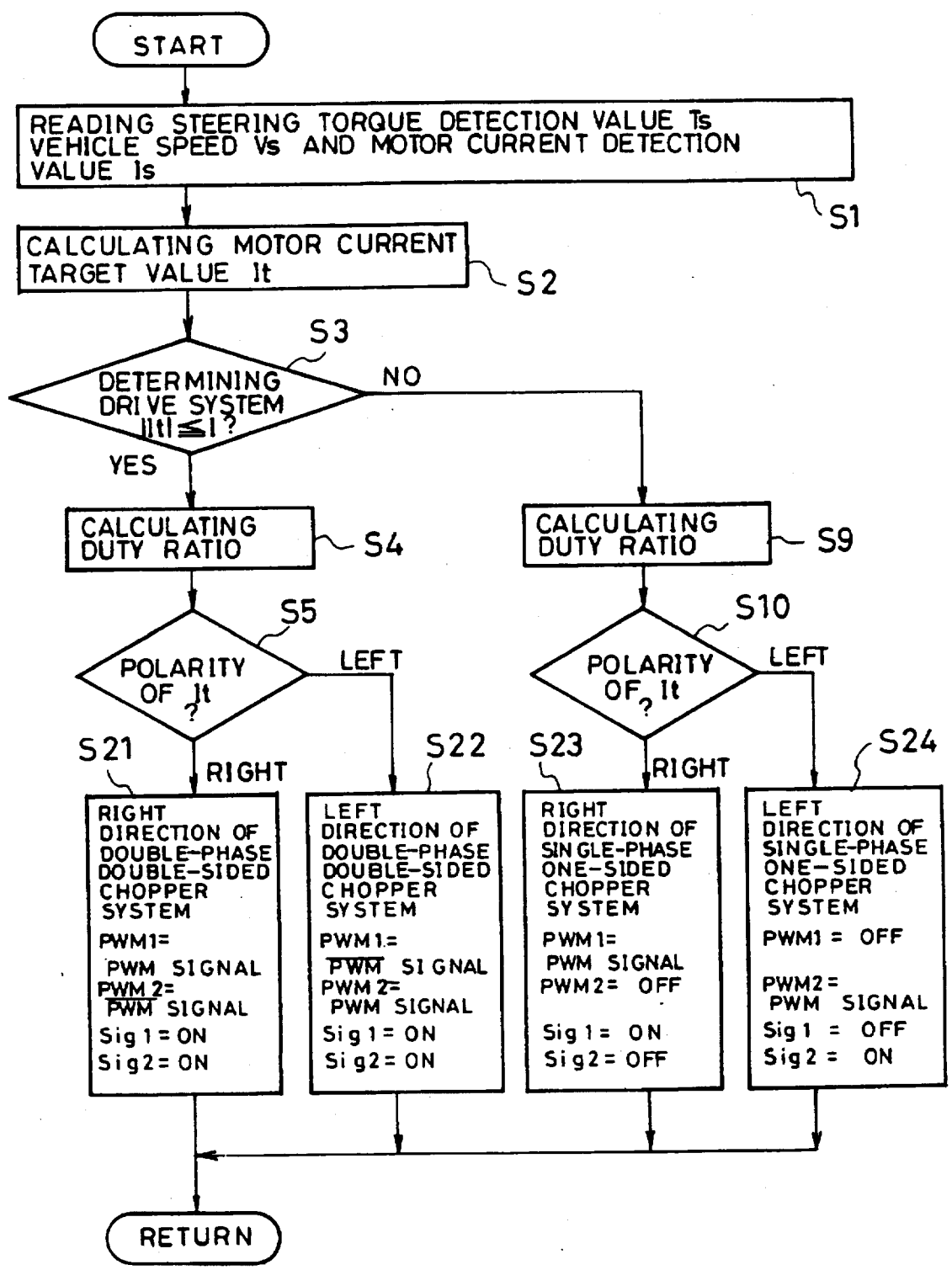
FIG. 9 is a flow chart showing the operation of Embodiment 2.
Figure 10:
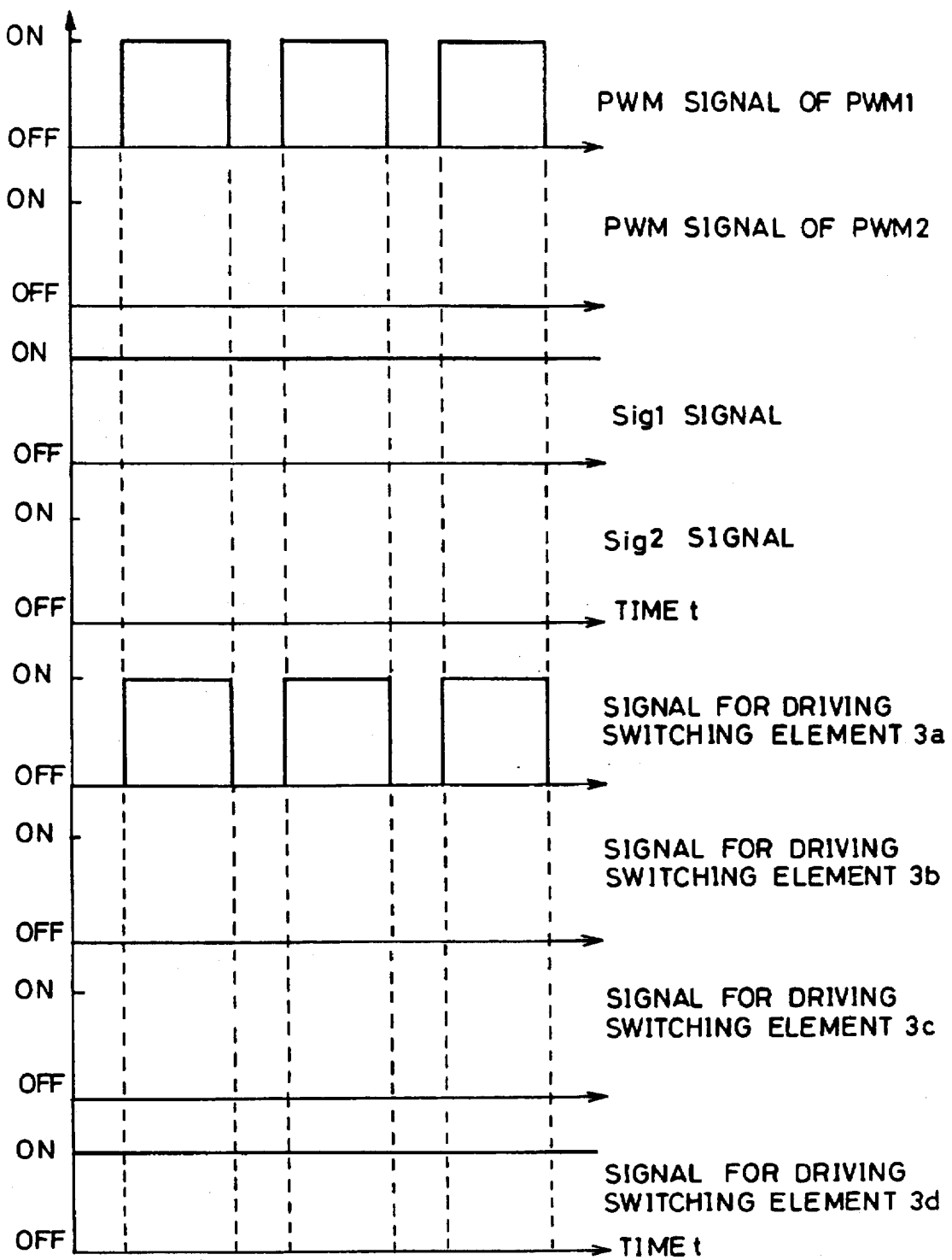
FIG. 10 is a timing chart explaining the operation of Embodiment 2.
Figure 11:
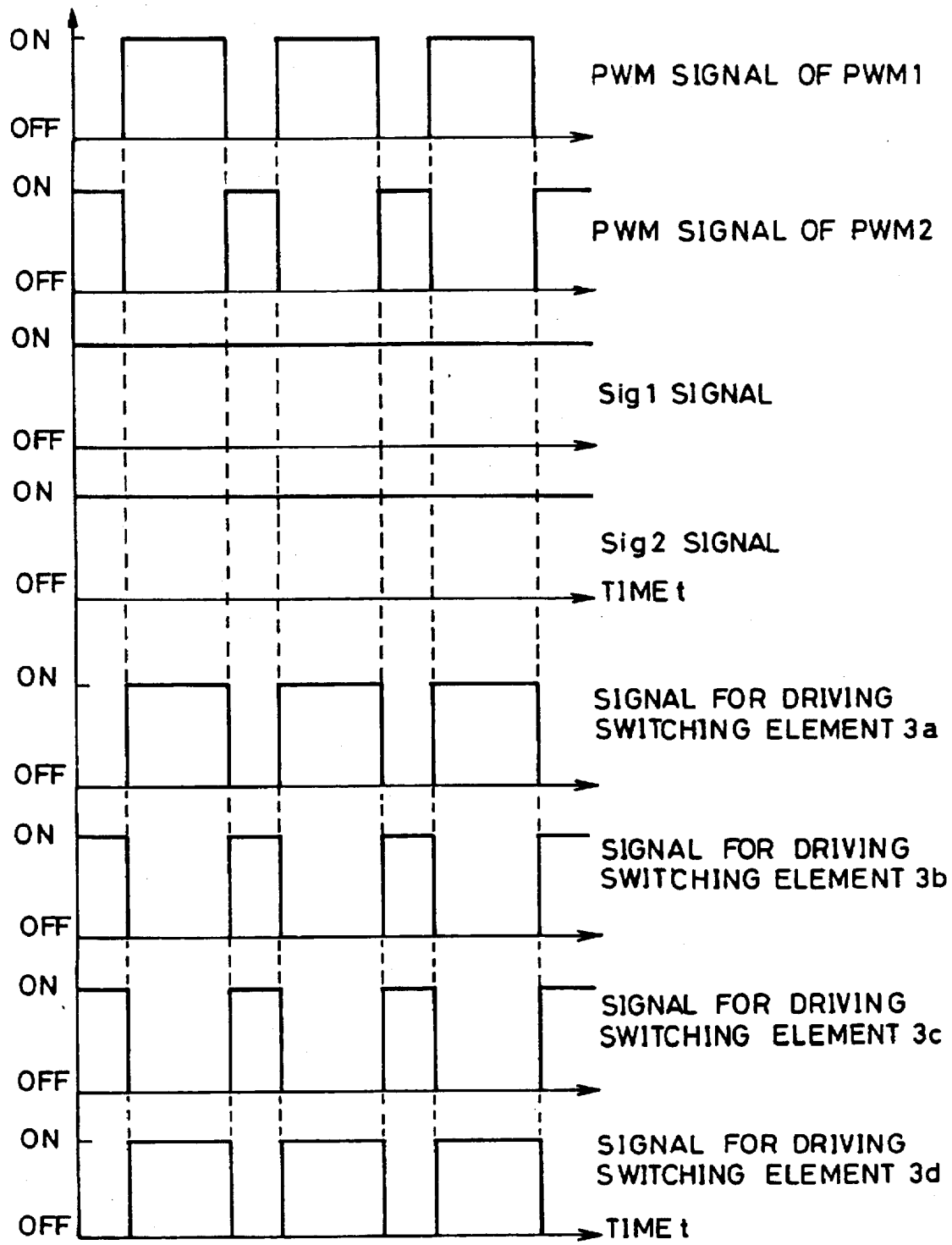
FIG. 11 is a timing chart explaining the operation of Embodiment 2.

A description is subsequently given of the operation of this Embodiment 2 with reference to a flow chart shown in FIG. 9. Steps S1 to S5 and steps S9 and S10 perform the same processings as steps S1 to S5 and steps 9 and 10 shown in FIG. 2, respectively, and, accordingly, their descriptions are omitted. If the direction of conduction in the motor 2 is determined to be right in step S5, the routine proceeds to step S21 to output drive signals as shown in FIG. 11 (PWM1= PWM signal, PWM2=inverted signal of the PWM signal, Sig1=ON, Sig2=ON) for a right direction of a double-phase double-sided chopper system to drive elements 3a–3d as shown in FIG. 11, and if the direction of conduction is left, the routine proceeds to step S22 to output drive signals (PWM1=inverted signal of the PWM signal, PWM2=PWM signal, Sig1=ON, Sig2=ON) for a left direction of a double-phase double-sided chopper system. When the motor current target value It is "0", a drive signal for a duty ratio of 50% in either right or left direction, that is, a drive signal for a duty ratio of 50% is output from both PWM1 and PWM2 to stop the revolution of the motor 2. If the direction of conduction in the motor 2 is determined to be right in step S10, the routine proceeds to step S23 to output drive signals as shown in FIG. 10 (PWM1=PWM signal, PWM2=OFF, Sig1=ON, Sig2=OFF) for a right direction of a single-phase one-sided chopper system to drive elements 3a–3d as shown in FIG. 7, and if the direction of conduction is determined to be left, the routine proceeds to step S24 to output drive signals (PWM1=OFF, PWM2=PWM signal, Sig1=OFF, Sig2=ON) for a left direction of a single-phase one-sided chopper system. This process is repeated to control the motor 2.

In a single-phase one-sided chopper system, drive signals as shown in FIG. 10 are output whereas, in a double-phase double-sided chopper system, drive signals as shown in FIG. 11 are output. In this instance, although the single-phased one-sided chopper system is inferior in response to the inversion of the motor 2 as described previously, in the control of this Embodiment 2, a double-phase double-sided chopper system is employed in an operation area where the motor 2 is inverted. A double-phase double-sided chopper system has an advantage that it is excellent in response to the inversion of the motor 2 as described previously. Further, since, in an area where a double-phase double-sided chopper system is employed, a motor current is small, heat generated from the switching elements 3a to 3d that is the demerit of a double-phase double-sided chopper system causes no problem.

As described above, according to this Embodiment 2, it is possible to control the motor 2 in an area suitable for each drive system by switching drive system so that, when the motor current target value It is large, the motor 2 is controlled by a single-phase one-sided chopper system, and when the motor current target value It is small, the motor 2 is controlled by a double-phase double-sided chopper system. Therefore, control that makes use of the advantages and compensates for the disadvantages of each drive system is possible, thereby improving driving comfort.

Embodiment 3

Figure 12:
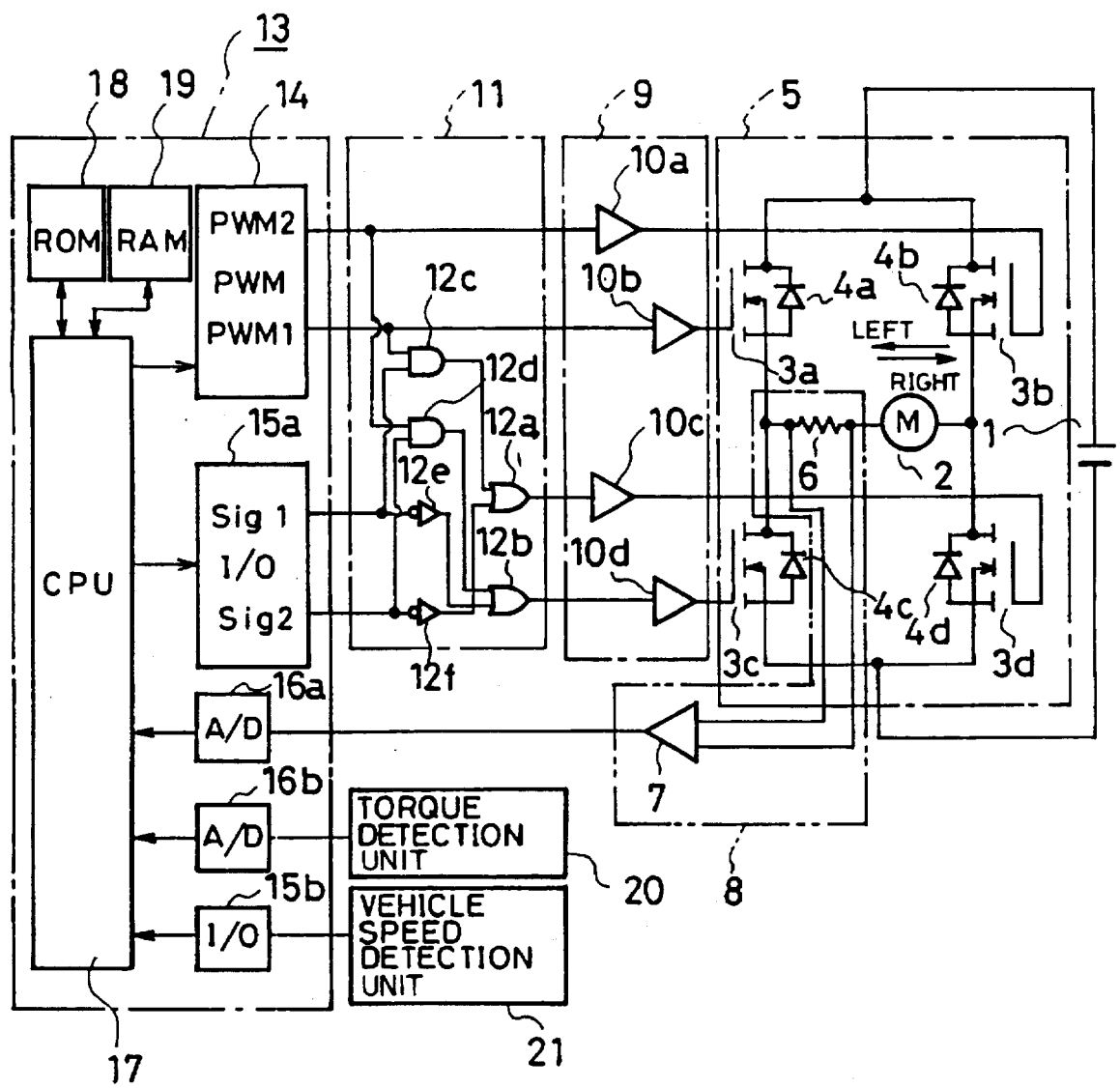
FIG. 12 is a diagram showing the configuration of Embodiment 3 of the present invention.

In the above Embodiments 1 and 2, the motor 2 is controlled by switching between a single-phase one-sided chopper system and either a single-phase double-sided chopper system or a double-phase double-sided chopper system according to the size of the motor current target value It. In Embodiment 3, drive system switching unit 11 is constituted by OR gates 12a and 12b, AND gates 12c and 12d and NOT gates 12e and 12f as shown in FIG. 12 to switch among three drive systems: single-phase one-sided chopper system, single-phase double-sided chopper system and double-phase double-sided chopper system.

Figure 13:
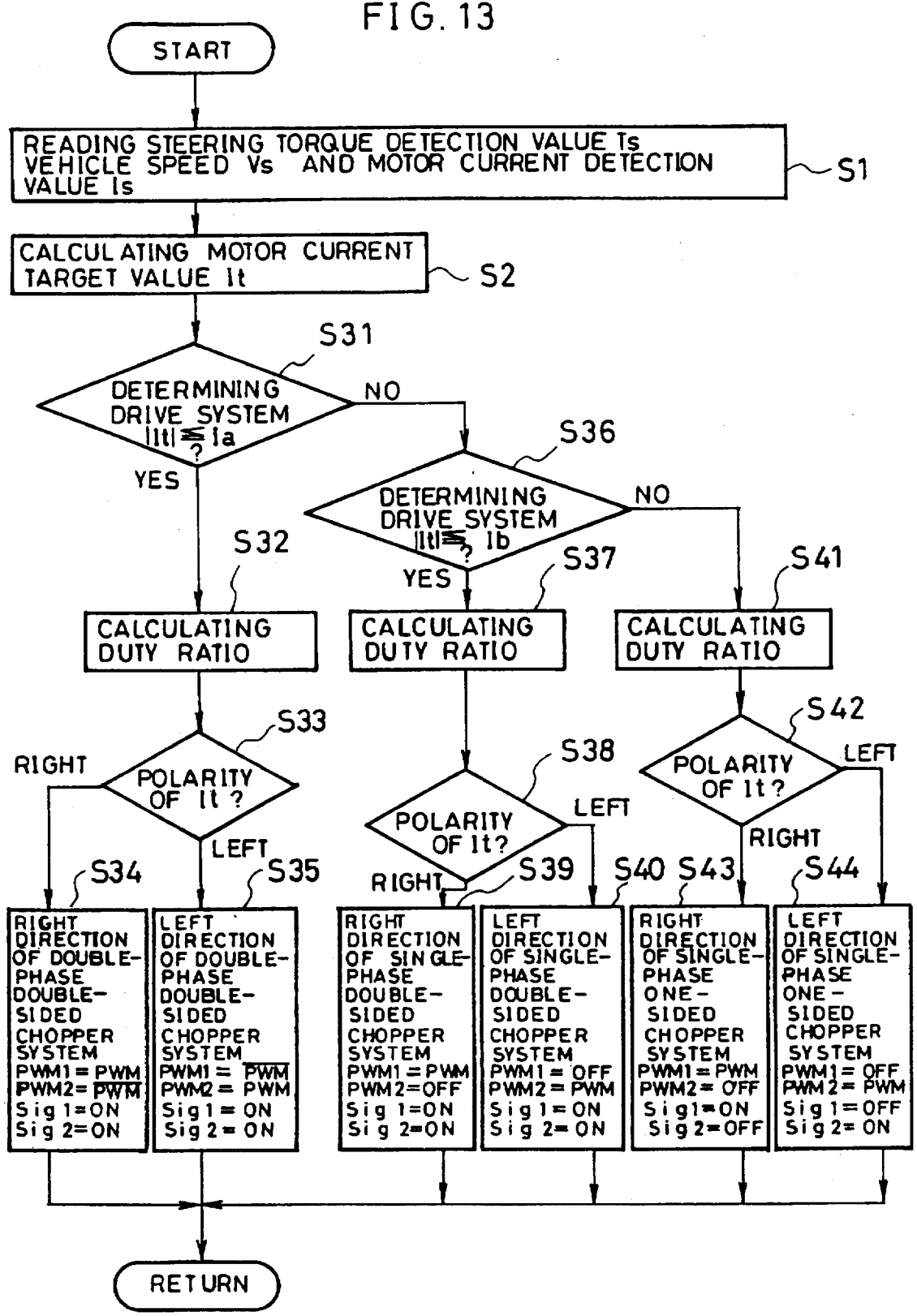
FIG. 13 is a flow chart showing the operation of Embodiment 3.

A description is subsequently given of the operation of this Embodiment 3 with reference to a flow chart shown in FIG. 13. Steps S1 and S2 perform the same processings as steps S1 and S2 shown in FIG. 2 and, accordingly, their descriptions are omitted. In step S31, it is determined whether or not an absolute value of the motor current target value It obtained in step S2 falls below a first predetermined value Ia. If the absolute value falls below Ia, the routine proceeds to step S32 to calculate a duty ratio and then to step S33 to determine the direction of conduction in the motor 2 from the polarity of the motor current target value It. If the direction of conduction in the motor 2 is determined to be right, the routine proceeds to step S34 to output drive signals (PWM1=PWM signal, PWM 2=inverted signal of the PWM signal, Sig1=ON, Sig2=ON) for a right direction of a double-phase double-sided chopper system, and if the direction is determined to be left, the routine proceeds to step S35 to output drive signals (PWM1=inverted signal of PWM signal, PWM2=PWM signal, Sig1=ON, Sig2=ON) for a left direction of a double-phase double-sided chopper system. When the motor current target value It is "0", a drive signal for a duty ratio 50% in either right or left direction, that is, a drive signal for a duty ratio of 50% is output from both PWM1 and PWM2 to stop the revolution of the motor 2. On the other hand, if the absolute value of the motor current target value It is determined to exceed the first predetermined value, that is, the absolute value of the motor current target value It is determined to be between the first predetermined value Ia and the second predetermined value Ib in step S31, the routine proceeds to step S36 to determine whether the absolute value of the motor current target value It falls below the second predetermined value Ib (the relationship between the first predetermined value Ia and the second predetermined value Ib is Ia<Ib). If the absolute value of the motor current target value It falls below the second predetermined value Ib, the routine proceeds to step S37 to calculate a duty ratio. In step S38, the direction of conduction in the motor 2 is determined from the polarity of the motor current target value It. If the direction is determined to be right, the routine proceeds to step S39 to output drive signals (PWM1=PWM signal, PWM 2=OFF, Sig1= ON, Sig2=ON) for a right direction of a single-phase double-sided chopper system, and if the direction is determined to be left, the routine proceeds to step S40 to output drive signals (PWM1=OFF, PWM2=PWM signal, Sig1= ON, Sig2=ON) for a left direction of a single-phase double-sided chopper system. On the other hand, if the absolute value of the motor current target value It is determined to exceed the second predetermined value Ib in step S36, the routine proceeds to step S41 to calculate a duty ratio. In step S42, the direction of conduction in the motor 2 is determined from the polarity of the motor current target value It. If the direction is determined to be right, the routine proceeds to step 43 to output drive signals (PWM1=PWM signal, PWM2=OFF, Sig1=ON, Sig2=OFF) for a right direction of a single-phase one-sided chopper system, and if the direction is determined to be left, the routine proceeds to step S44 to output drive signals (PWM1=OFF, PWM2=PWM signal, Sig1=OFF, Sig2=ON) for a left direction of a single-phase one-sided chopper system. This process is repeated to control the motor 2.

In short, according to this Embodiment 3, the motor 2 is controlled by employing each drive system in its suitable area to make use of the advantages of each system. Therefore, response to the inversion is improved in an area where the revolution direction of the motor 2 is inverted, controllability is improved in an area where duty ratio is small, and further the amount of heat generated from the switching elements can be reduced in an area where duty ratio is large.

Embodiment 4

In Embodiment 1, a drive system of the bridge circuit 5 is switched based on the motor current target value It. When feedback control of a motor current is not performed, a drive system may be switched based on a motor application voltage target value Vt as shown in FIG. 14.

Figure 14:
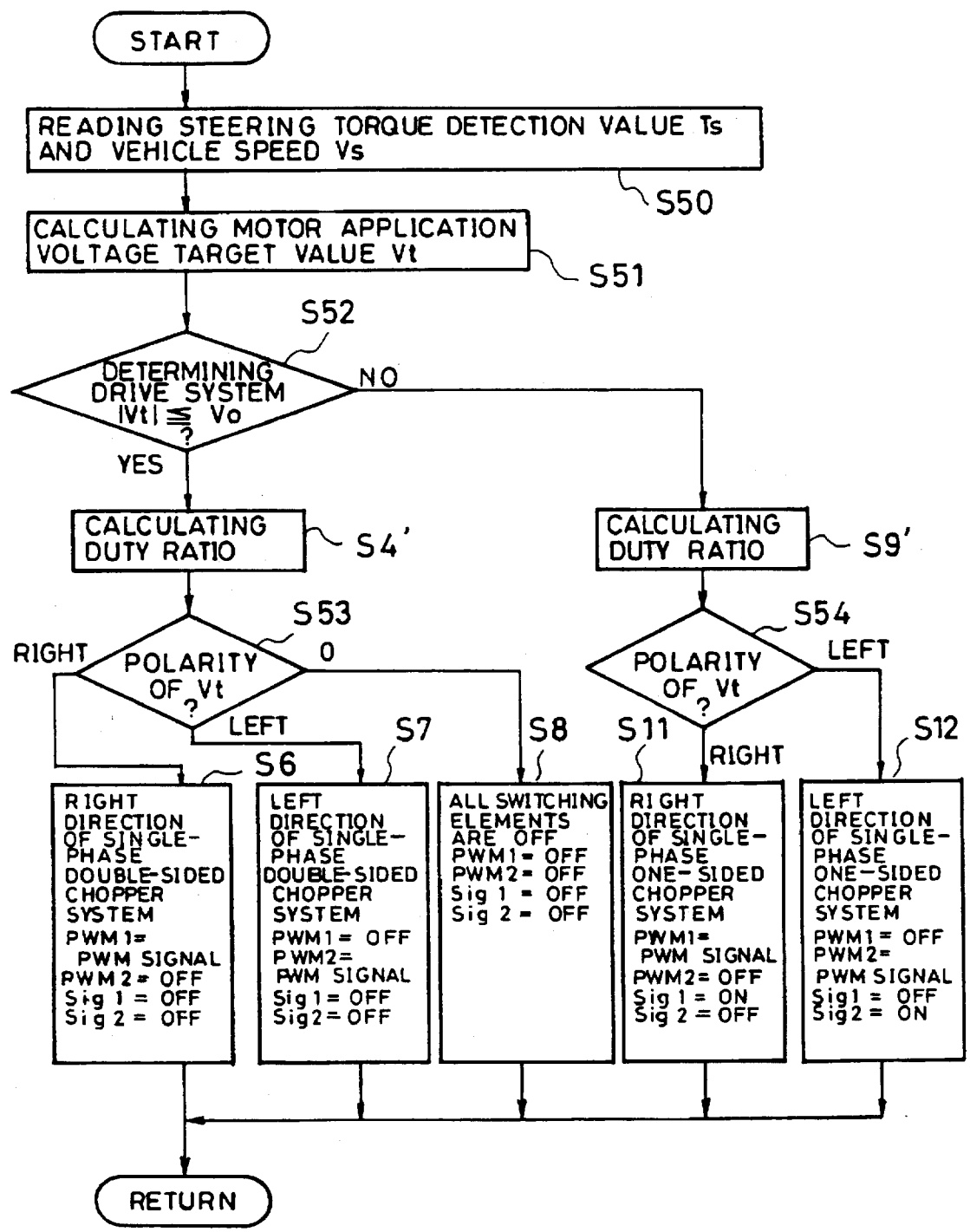
FIG. 14 is a flow chart showing the operation of Embodiment 4 of the present invention.

A description is given of the operation of the control means 13 of this Embodiment 4 with reference to a flow chart of FIG. 14. First, a steering torque detection value Ts and a vehicle speed Vs are read in step S50, and a motor application voltage target value Vt is calculated from the steering torque detection value Ts and the vehicle speed Vs in step S51. In the subsequent step S52, a drive system is determined such that, if the motor application voltage target value Vt falls below a predetermined value Vo, a single-phase double-sided chopper system is employed, and if the value exceeds the predetermined value Vo, a single-phase one-sided chopper system is used. Further, in step S4' or S9', a duty ratio for driving the switching elements 3a to 3d is calculated from the motor application voltage target value Vt according to a drive system. The duty ratio is determined by the following expression.

[expression 3]
$$\text{duty ratio} = \frac{V_t \text{ (motor application voltage target value)}}{V_s \text{ (power voltage)}} \quad (3)$$

Thereafter, in step S53 and steps S6 to 8, or steps S54, S11 and S12, a PWM signal (=PWM1 or PWM2) and drive system switching signals sig1 and sig2 are applied to the drive system switching unit 11. In a single-phase double-sided chopper system and single-phase one-sided chopper system, the route and effect of a current in the motor 2 when the motor 2 is driven are perfectly the same as those of Embodiment 1 and, hence, their descriptions are omitted.

Embodiment 4 in which a drive system is switched between a single-phase double-sided chopper system and a single-phase one-sided chopper system based on the motor application voltage target value Vt can provide the same effect as Embodiment 1.

When a drive system is switched between a double-phase double-sided chopper system and a single-phase one-sided chopper system like Embodiment 2, if a drive system is switched based on the motor application voltage target value Vt like Embodiment 4, the same effect can be obtained. In this case, since all the switching elements need not to be turned off, this embodiment can be realized by replacing steps S6, S7, S11 and S12 by steps S21, S22, S23 and S24, respectively, and eliminating step 8.

Embodiment 5

Figure 15:
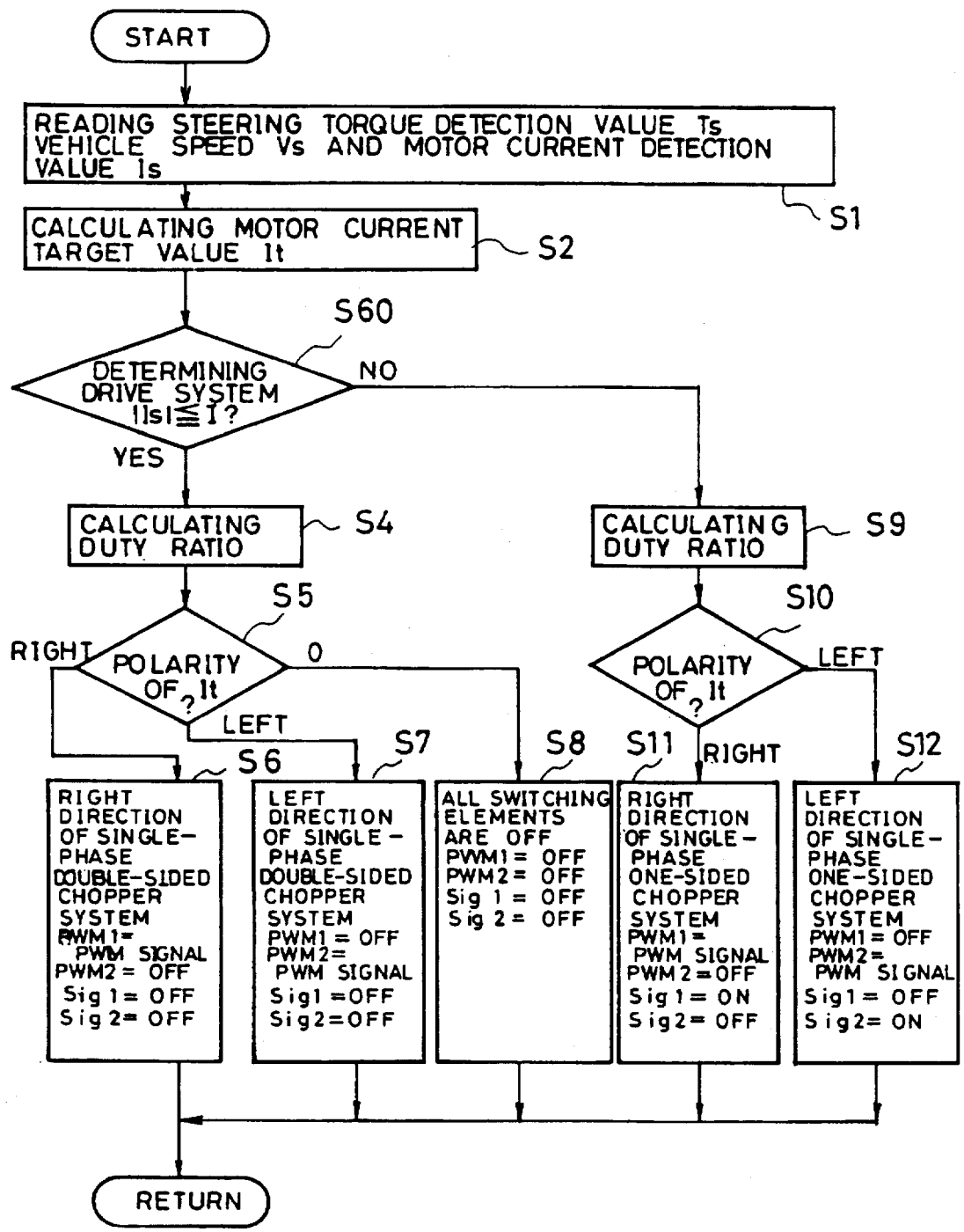
FIG. 15 is a flow chart showing the operation of Embodiment 5 of the present invention.

In the above Embodiments 1 to 3, a drive system is switched by determining whether or not the motor current target value It falls below the predetermined value I. However, as shown in FIG. 15, a drive system may be switched by determining whether or not the motor current detection value Is falls below the predetermined value I. FIG. 15 shows the case where the decision condition is different from that of Embodiment 1, but the same effect can be obtained even if the decision condition in Embodiment 2 or 3 is changed.

Embodiment 6

Figure 16:
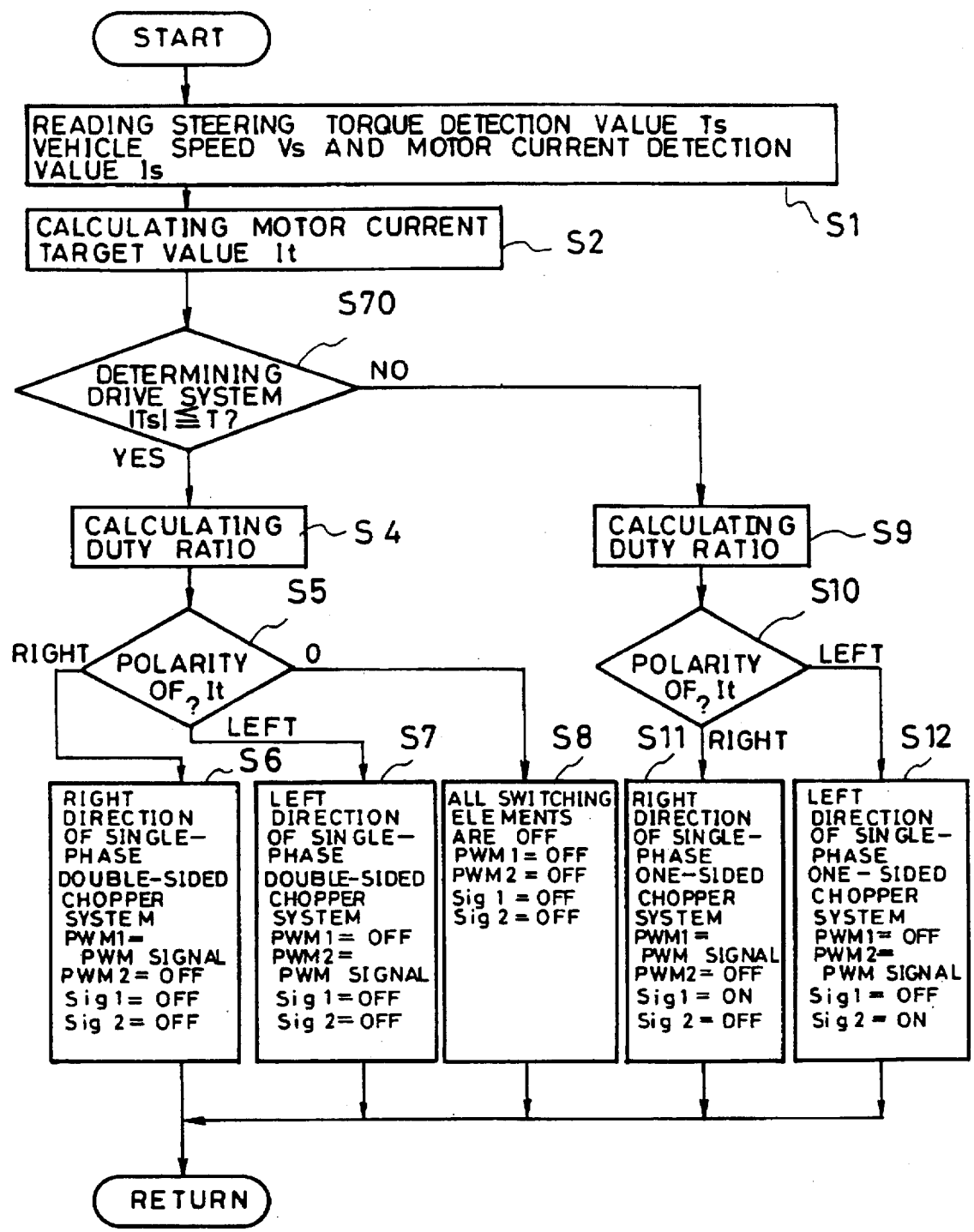
FIG. 16 is a flow chart showing the operation of Embodiment 6 of the present invention.

In the above Embodiments 1 to 3, a drive system is switched by determining whether or not the motor current target value It falls below the predetermined value I. However, as shown in FIG. 16, a drive system may be switched by determining whether or not the steering torque detection value Ts falls below a predetermined value T. FIG. 16 shows the case where the decision condition is different from that of Embodiment 1, but the same effect can be obtained even if the decision condition in Embodiment 2 or 3 is changed.

Embodiment 7

Figure 17:
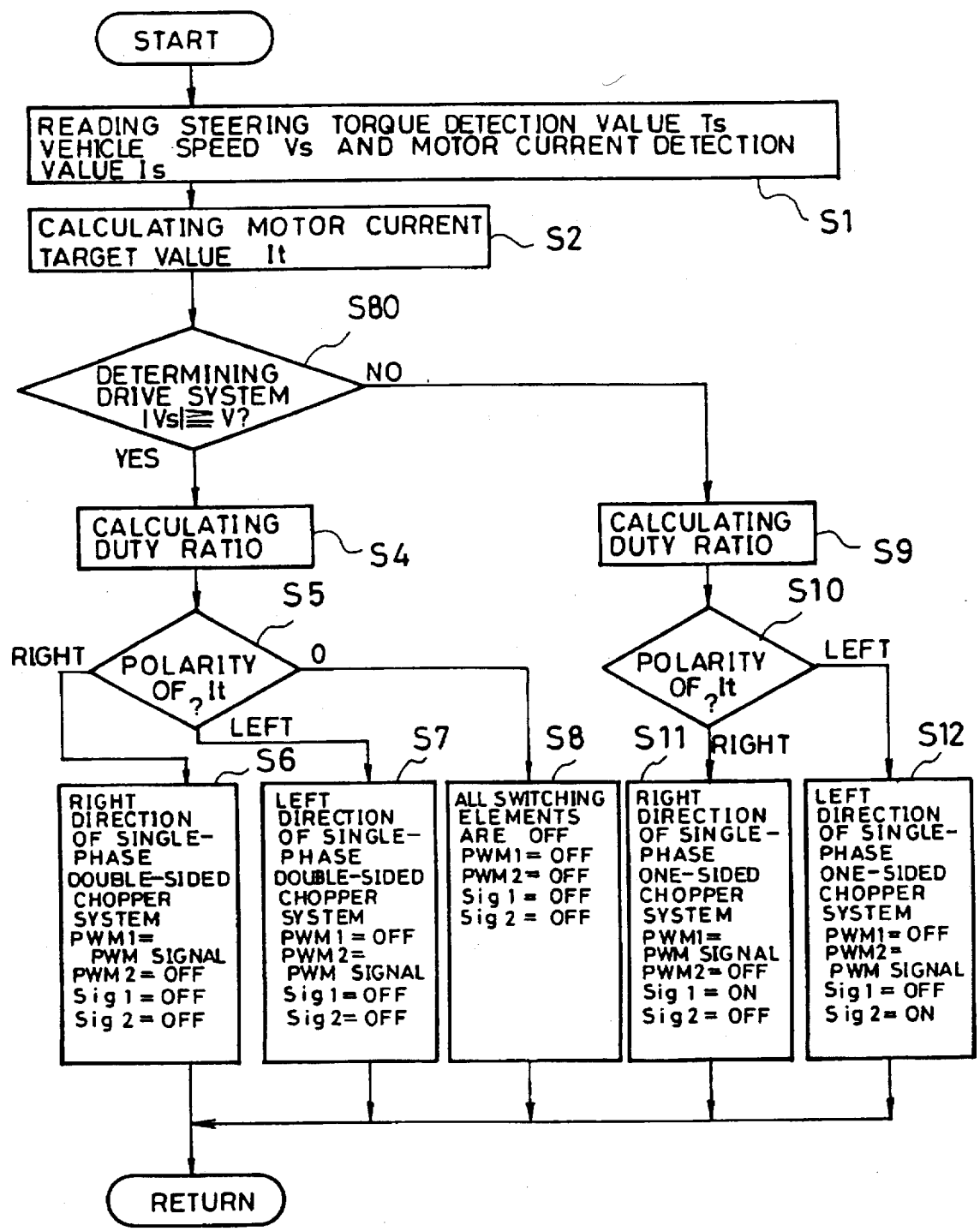
FIG. 17 is a flow chart showing the operation of Embodiment 7 of the present invention.

In the above Embodiments 1 to 3, a drive system is switched by determining whether or not the motor current target value It fails below the predetermined value I. However, as shown in FIG. 17, a drive system may be switched by determining whether or not the vehicle speed Vs falls below a predetermined value V. FIG. 17 shows the case where the decision condition is different from that of Embodiment 1, but the same effect can be obtained even if the decision condition in Embodiment 2 or 3 is changed.

Embodiment 8

In the above Embodiment 1, a drive system is switched according to the decision condition, that is, whether or not the motor current target value It falls below the predetermined value I. Therefore, at the time of driving under the condition that the motor current target value It is around the above predetermined value I, a drive system is switched frequently and driving comfort becomes worse. Then, control in accordance with a flow chart shown in FIG. 18 provides a hysteresis component to the drive system switching condition, thereby preventing frequent switching of drive system.

Figure 18:
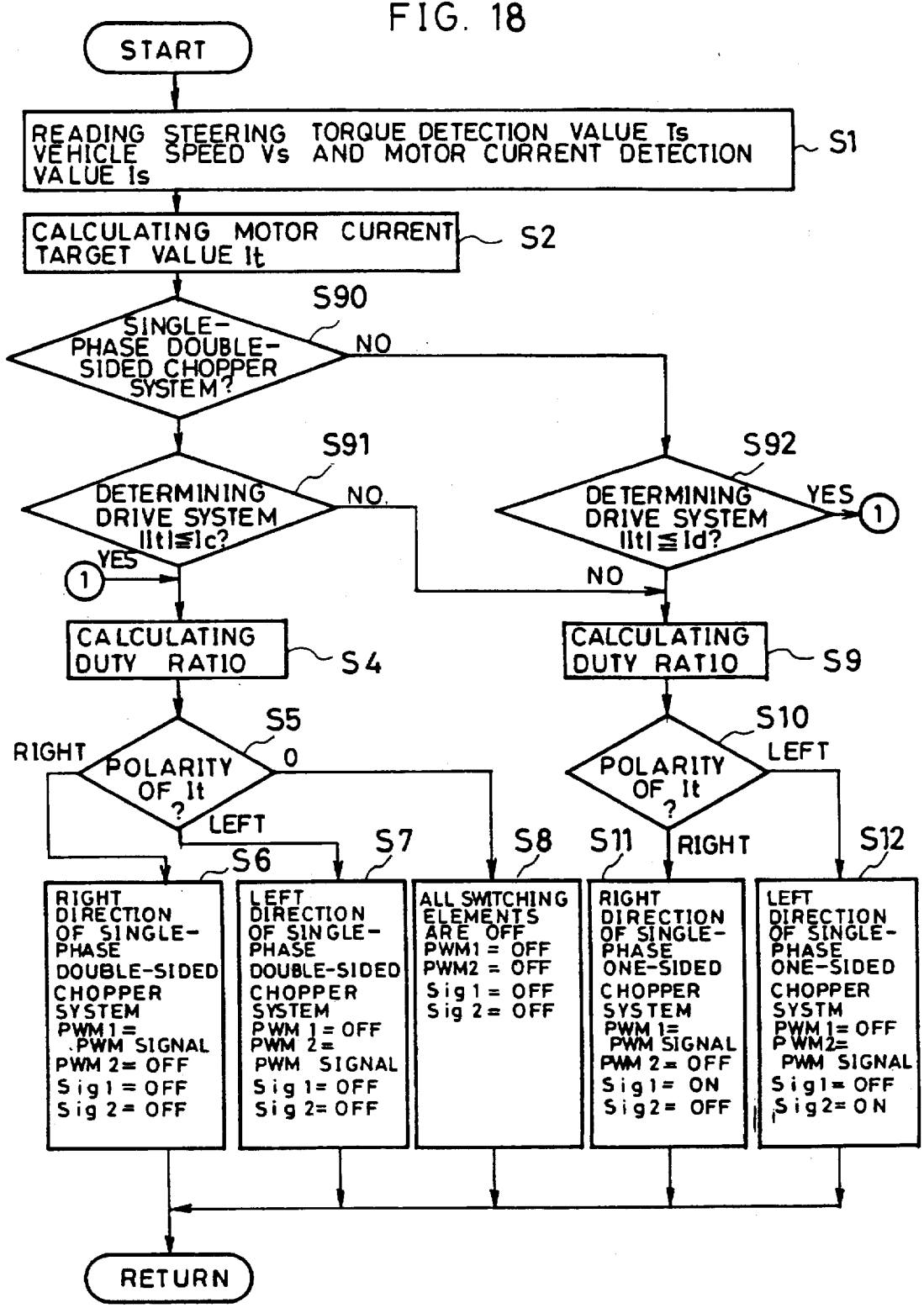
FIG. 18 is a flow chart showing the operation of Embodiment 8 of the present invention.

FIG. 18 is a flow chart in which the drive system switching condition in Embodiment 1 is changed, and accordingly, descriptions of the same steps as in the flow chart of FIG. 2 are omitted. Whether or not a drive system is switched is determined as follows. It is first determined whether or not the previous decision result is a single-phase double-sided chopper system in step S90. If it is a single-phase double-sided chopper system, the routine proceeds to step 91 to determine whether or not an absolute value of the motor current target value It falls below a third predetermined value Ic. If the absolute value of the motor current target value It falls below the third predetermined value Ic, the routine proceeds to step S4, and if the value does not fall below the third predetermined value Ic, the routine proceeds to step S9. On the other hand, if the previous decision result is not a single-phase double-sided chopper system in the step S90, the routine proceeds to step S92 to determine whether or not an absolute value of the motor current target value It falls below a fourth predetermined value Id (the relationship between Ic and Id is Ic>Id). If the absolute value of the motor current target value It falls below the fourth predetermined value Id, the routine proceeds to step S4, and if the absolute value does not fall below the fourth predetermined value Id, the routine proceeds to step 9. In steps 84 and S9, a duty ratio is calculated in the same manner as in Embodiment 1 to perform control in the same manner.

In this way, by providing a hysteresis component to the drive system switching condition, variations in the torque of the motor 2 and deterioration in driving comfort caused by switching drive system during driving as the motor current target value It is close to the predetermined value I as the switching condition can be alleviated. Further, the same effect can be obtained by providing a hysteresis component to the drive system switching condition of Embodiments 2 to 7.

Embodiment 9

Figure 19:
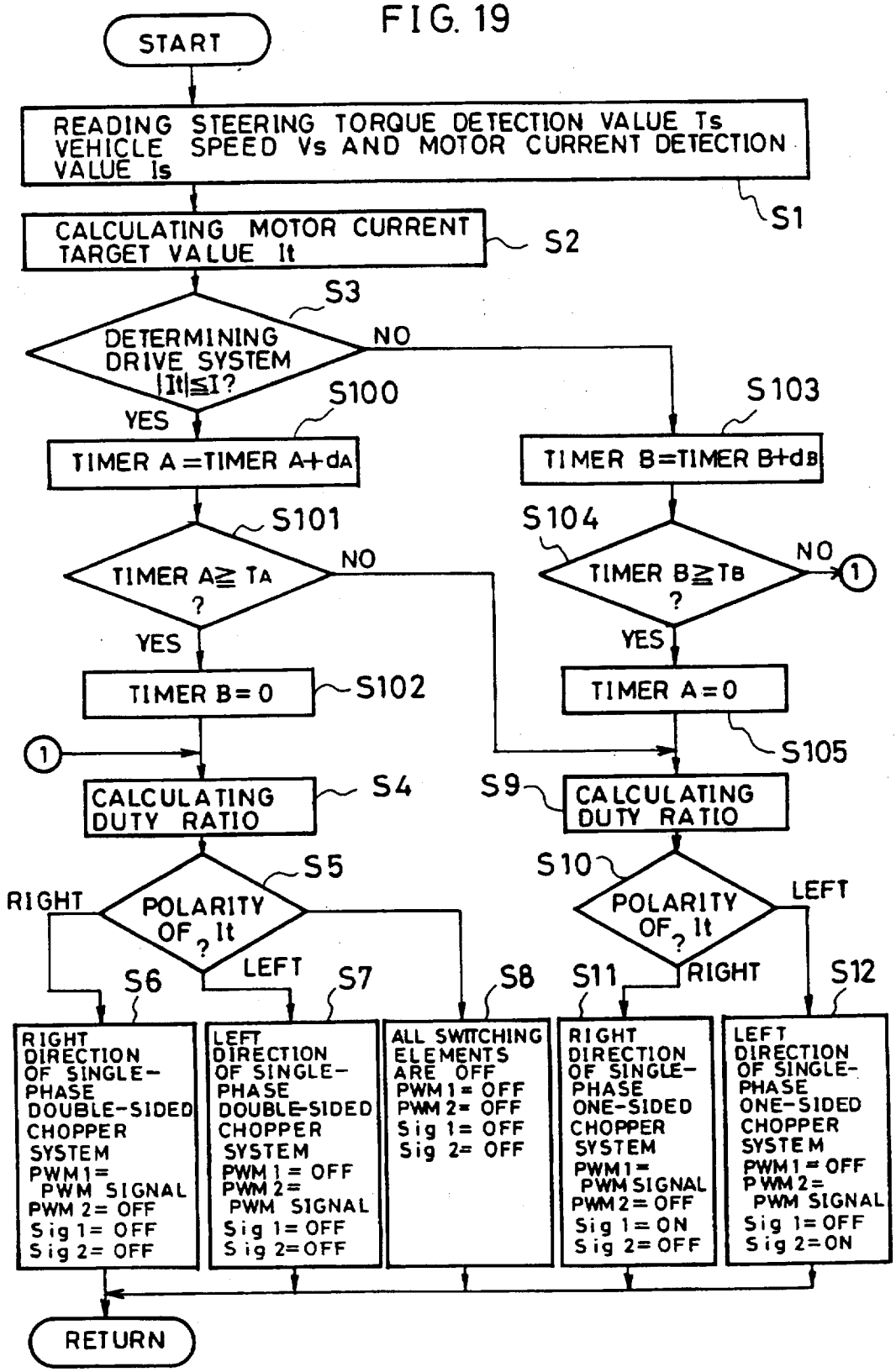
FIG. 19 is a flow chart showing the operation of Embodiment 9 of the present invention.

Although the control means 13 of Embodiment 1 determines the drive system of the bridge circuit 5 based on the motor current target value It, as shown in FIG. 19, a timer element may be provided to switch a drive system when the decision condition is continued for a predetermined time period.

A description is given of the operation of the control means 13 of this Embodiment 9 with reference to a flow chart of FIG. 19. As in the above Embodiment 1, a steering torque detection value Ts, a vehicle speed Vs, and a motor current detection value Is are first read in step S1, and a motor current target value It is calculated in step S2. Thereafter, if it is determined that the motor current target value It falls below a predetermined value I in step S3, a predetermined time dA is added to a time counter TimerA in step S100. Then if the time counter TimerA determines that its counted value exceeds a predetermined value TA in step S101, drive system is determined to be a single-phase double-sided chopper system so that a time counter TimerB is reset to "0" in step S102. Thereafter, steps S4 to S8 are carried out sequentially. These steps are the same as in Embodiment 1 and accordingly, their descriptions are omitted.

If the time counter TimerA determines that its counted value falls below the predetermined value TA, a drive system is determined to be a single-phase one-sided chopper system and Steps S9 to S12 are carried out sequentially. These steps are the same as in Embodiment 1 and accordingly, their descriptions are omitted.

On the other hand, if it is determined that the motor current target value It exceeds the predetermined value I in step S3, a predetermined time dB is added to the time counter TimerB in step S103. Thereafter, if the time counter TimerB determines that its counted value exceeds a predetermined value TB, drive system is determined to be a single-phase one-sided chopper system and the time counter TimerA is reset to "0" in step S105. Then, steps S9 to S12 are carried out sequentially. These steps are the same as in Embodiment 1 and accordingly, their descriptions are omitted.

If the time counter TimerB determines that its counted value falls below the predetermined time TB in step S104, drive system is determined to be a single-phase double-sided chopper system and steps S4 to S8 are carried out sequentially. These steps are the same as in Embodiment 1 and accordingly, their descriptions are omitted.

If the time counters are used like this Embodiment 9, frequent switching of drive system can be prevented without adding a hysteresis element to the decision of drive system and rapid changes in the torque and revolution speed of the motor 2 can be reduced upon switching of the drive system.

When drive system is switched between a double-phase double-sided chopper system and single-phase one-sided chopper system like Embodiment 2, if time counters are used to switch drive system like this Embodiment 9, the same effect can be obtained. In this case, since all the switching elements do not need to be turned off, this embodiment can be realized by replacing steps S6, S7, S11 and S12 by steps S21, S22, S23 and S24, respectively, and excluding step S8.

Embodiment 10

Figure 20:
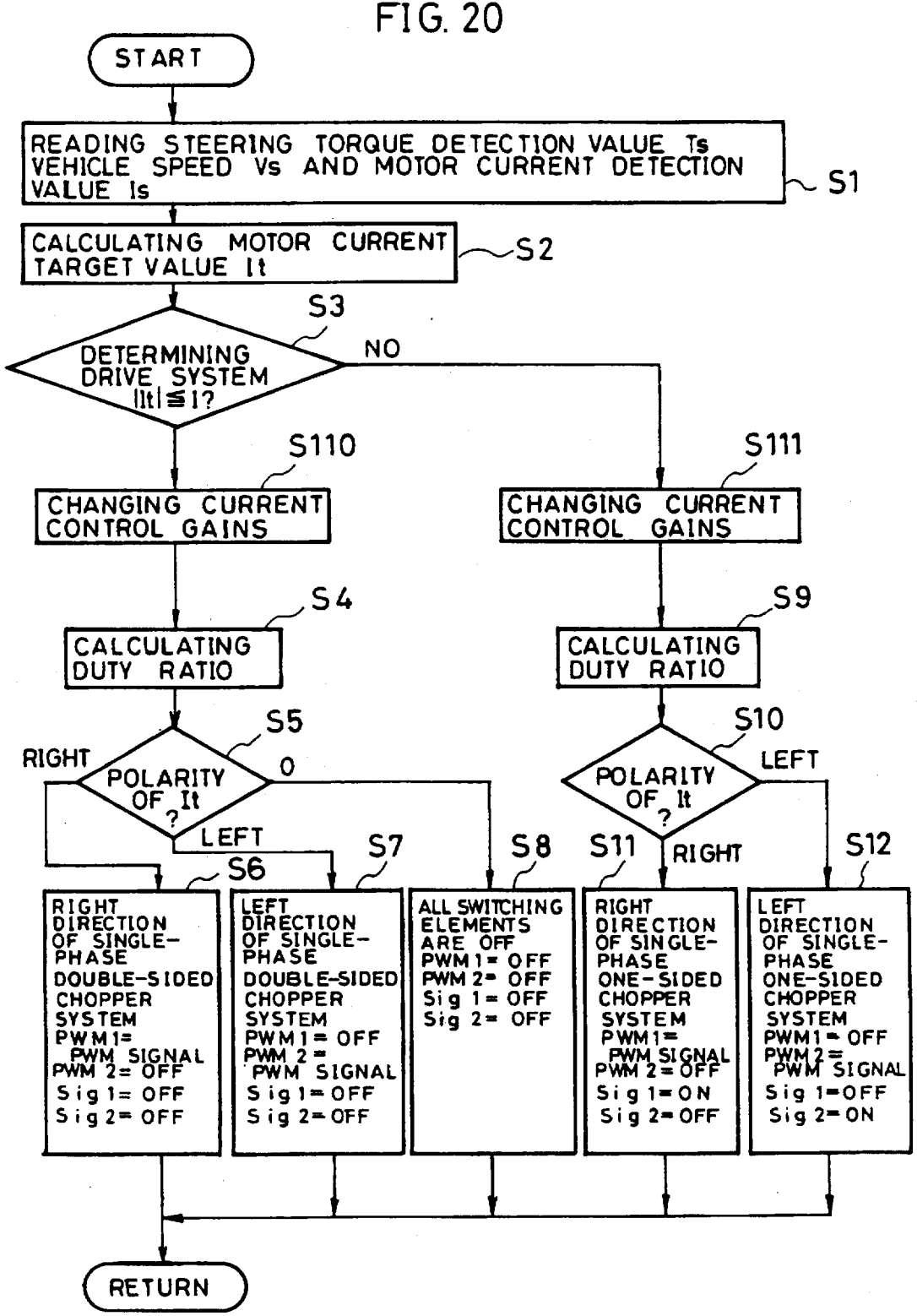
FIG. 20 is a flow chart showing the operation of Embodiment 10 of the present invention.

In the above Embodiments 1 to 9, switching conditions are met to switch a drive system. Mere switching of drive system causes problems such as changes in the torque of the motor 2 and deterioration in driving comfort. As shown in a flow chart of FIG. 20, gains (proportional constant, integration constant and differential constant) used for the calculation of a duty ratio (PID calculation) are changed to gains suitable for a drive system to be switched in order to suppress changes in the torque of the motor 2 upon switching of a drive system and further improve driving comfort. FIG. 20 shows the case where this is applied to Embodiment 1, but it is needless to say that the same effect can be obtained when this is also applied to Embodiments 2 to 9.

Embodiment 11

Figure 21:
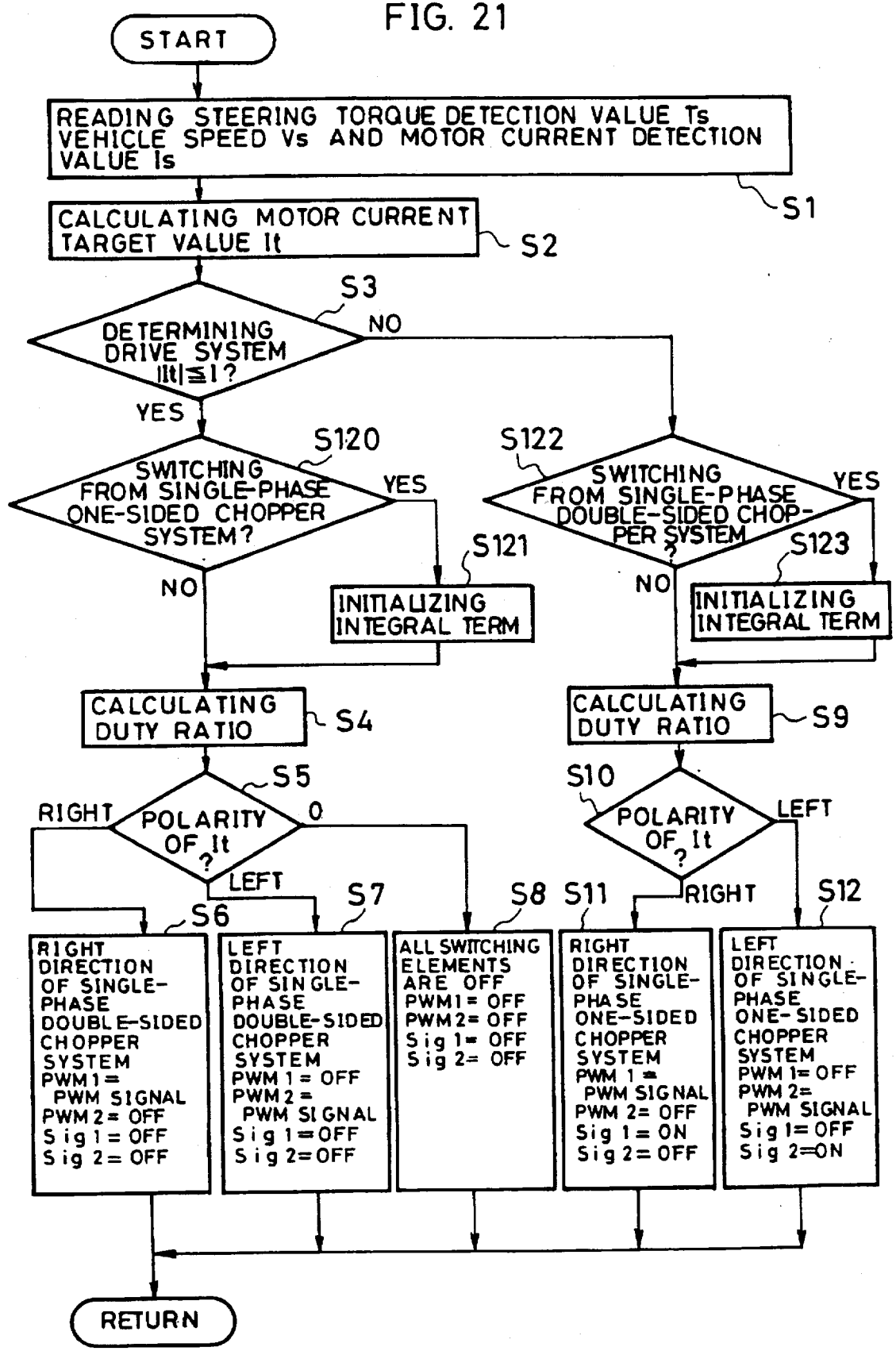
FIG. 21 is a flow chart showing the operation of Embodiment 11 of the present invention.

When the control means 13 of Embodiment 1 performs at least integral control of the motor 2 in accordance with the motor current target value It and the motor current detection value Is at the time of calculating a duty ratio, as shown in FIG. 21, an integral term may be initialized by determining switching of a drive system after determining the drive system.

A description is given of the operation of the control means 13 of this Embodiment 11 with reference to a flow chart of FIG. 21. As in Embodiment 1, a steering torque detection value Ts, a vehicle speed Vs, and a motor current detection value Is are first read in step S1, and then a motor current target value It is calculated in step S2. Further, if the motor current target value It falls below a predetermined value I, the drive system of the bridge circuit 5 is determined to be a single-phase double-sided chopper system in step S3, and if the motor current target value It exceeds the predetermined value I, the drive system of the bridge circuit 5 is determined to be a single-phase one-sided chopper system.

However, average motor application voltage differs according to the drive system upon switching of a drive system as shown in Embodiment 12 to be described later, and there are big changes in the torque and revolution speed of the motor 2.

Then, in this Embodiment 11, it is determined whether or not a drive system is switched. If it is determined that drive system is switched, an integral term which is an essential factor of calculating a duty ratio is initialized to make constant average motor application voltage before and after switching a drive system, thereby alleviating changes in the torque and revolution speed of the motor 2.

For instance, in the case of PID control of a motor current, a duty ratio can be represented by the following equation.

duty ratio=proportional term (term P)+integral term (term I) and differential term (term D) (14)

For brevity's sake, when only a stationary condition is taken into account, a duty ratio can be represented by the following equation.

duty ratio=integral term (15)

In this instance, according to Embodiment 12 to be described later, an initial value of duty ratio for alleviating rapid changes in the torque and revolution speed of the motor 2 upon switching of drive system from a single-phase one-sided chopper system to a single-phase double-sided chopper system is obtained from the following equation.

duty2=(½)×duty1+50 (6)

Therefore, when an integral term for driving with a single-phase one-sided chopper system is represented by i_term1 and an integral term for driving with a single-phase double-sided chopper system is represented by i_term2, to switch drive system from a single-phase one-sided chopper system to a single-phase double-sided chopper system so that the torque and revolution speed of the motor 2 do not change rapidly, an initial value of i_term2 upon switching may be set as follows by inserting the equation (15) into the equation (6).

i_term2=(½)×i_term1+integral term at a duty ratio of 50% under stationary condition (16)

According to Embodiment 12, when drive system is switched from a single-phase double-sided chopper system to a single-phase one-sided chopper system, an initial value of duty ratio may be set as follows.

duty1=2×(duty2−50) (7)

Therefore, to switch a drive system from a single-phase double-sided chopper system to a single-phase one-sided chopper system, an initial value of i_term1 upon switching may be set as follows by inserting the equation (15) into the equation (7).

i_term1=2×(i_term2−integral term at a duty ratio of 50% under stationary condition) (17)

In other words, when a drive system is determined to be a single-phase double-sided chopper system in step S3, it is determined whether or not a drive system is switched from a single-phase one-sided chopper system in step S120. If it is determined that a drive system is switched, the integral term may be initialized using the equation (16) in step S121. Thereafter, steps S4 to S8 are carried out sequentially. Since these steps are the same as in Embodiment 1, their descriptions are omitted.

If it is determined that a drive system is not switched in step S120, steps S4 to S8 are carried out sequentially. Since these steps are the same as in Embodiment 1, their descriptions are omitted.

On the other hand, if a drive system is determined to be a single-phase one-sided chopper system in step S3, it is determined whether or not a drive system is switched from a single-phase double-sided chopper system in step S122. If it is determined that a drive system is switched in step S122, the integral term is initialized using the equation (17) in step S123. Thereafter, steps S9 to S12 are carried out sequentially. Since these steps are the same as in Embodiment 1, their descriptions are omitted.

If it is determined that a drive system is not switched in step S122, steps S9 to S12 are carried out sequentially. Since these steps are the same as in Embodiment 1, their descriptions are omitted.

Since average motor application voltage becomes almost constant upon switching of drive system due to initialization in this Embodiment 11, rapid changes in the torque and revolution speed of the motor 2 can be alleviated.

Further, when a drive system is switched between a double-phase double-sided chopper system and single-phase one-sided chopper system like Embodiment 2, the same effect can be obtained by initializing the integral term like this Embodiment 11.

An initial value of duty ratio for alleviating rapid changes in the torque and revolution speed of the motor 2 when a drive system is switched from a single-phase one-sided chopper system to a double-phase double-sided chopper system is obtained from the following equation when the motor 2 is driven in a right direction.

$$duty3=-(\tfrac{1}{2})\times duty1+50 \qquad (10)$$

The initial value is obtained from the following equation when the motor 2 is driven in a left direction.

$$duty\,3=-(\tfrac{1}{2})\times duty\,1+50 \qquad (11)$$

Therefore, to switch a drive system from a single-phase one-sided chopper system to a double-phase double-sided chopper system so that the torque and revolution speed of the motor 2 do not change rapidly, an initial value of i_term3 upon switching should be set as follows by inserting the equation (15) into the equations (10) and (11) when the motor 2 is driven in a right direction.

$$i\_term3=(\tfrac{1}{2})\times i\_term1+\text{integral term at a duty ratio of 50\% under stationary condition} \qquad (18)$$

And the initial value should be set as follows when the motor 2 is driven in a left direction.

$$i\_term3=-(\tfrac{1}{2})\times i\_term1+\text{integral term at a duty ratio of 50\% under stationary condition} \qquad (19)$$

Similarly, an initial value of duty ratio for alleviating rapid changes in the torque and revolution speed of the motor 2 when a drive system is switched from a double-phase double-sided chopper system to a single-phase one-sided chopper system is obtained from the following equation when the motor 2 is driven in a right direction.

$$duty1=2\times(duty3-50) \qquad (12)$$

The initial value is obtained from the following equation when the motor 2 is driven in a left direction.

$$duty1=2\times(50-duty3) \qquad (13)$$

Therefore, when a drive system is switched from a double-phase double-sided chopper system to a single-phase one-sided chopper system, an initial value of i_term3 should be set as follows by inserting the equation (15) into the equations (12) and (13) when the motor 2 is driven in a right direction.

$$i\_term1=2\times(i\_term3-\text{integral term at a duty ratio of 50\% under stationary condition}) \qquad (20)$$

The initial value should be set as follows when the motor 2 is driven in a left direction.

$$i\_term1=2\times(\text{integral term at a duty ratio of 50\% under stationary condition}-i\_term3) \qquad (21)$$

That is, when a drive system is determined in step S3 and the system is determined to be a double-phase double-sided chopper system it is determined whether or not a drive system is switched from a single-phase one-sided chopper system in step S120 like this Embodiment 11. If it is determined that a drive system is switched, the integral term is initialized using the equation (18) or (19) in step S121.

On the other hand, if a drive system is determined to be a single-phase one-sided chopper system, it is determined whether or not a drive system is switched from a double-phase double-sided chopper system in step S122. If it is determined that a drive system is switched, the integral term is initialized using the equation (20) or (21) in step S123.

Since it is not necessary to turn off all the switching elements 3a to 3d, steps S6, S7, S11 and S12 are replaced by steps S21, S22, S23 and S24, respectively and step S8 is excluded. Since the steps other than these steps are completely the same as steps for initializing the integral term when a drive system is switched between a single-phase double-sided chopper system and single-phase one-sided chopper system, their descriptions are omitted. In either one of the above cases, it is needless to say that a hysteresis element and a timer element may be added to decision on switching of drive system like Embodiments 8 and 9.

Embodiment 12

Figure 22:
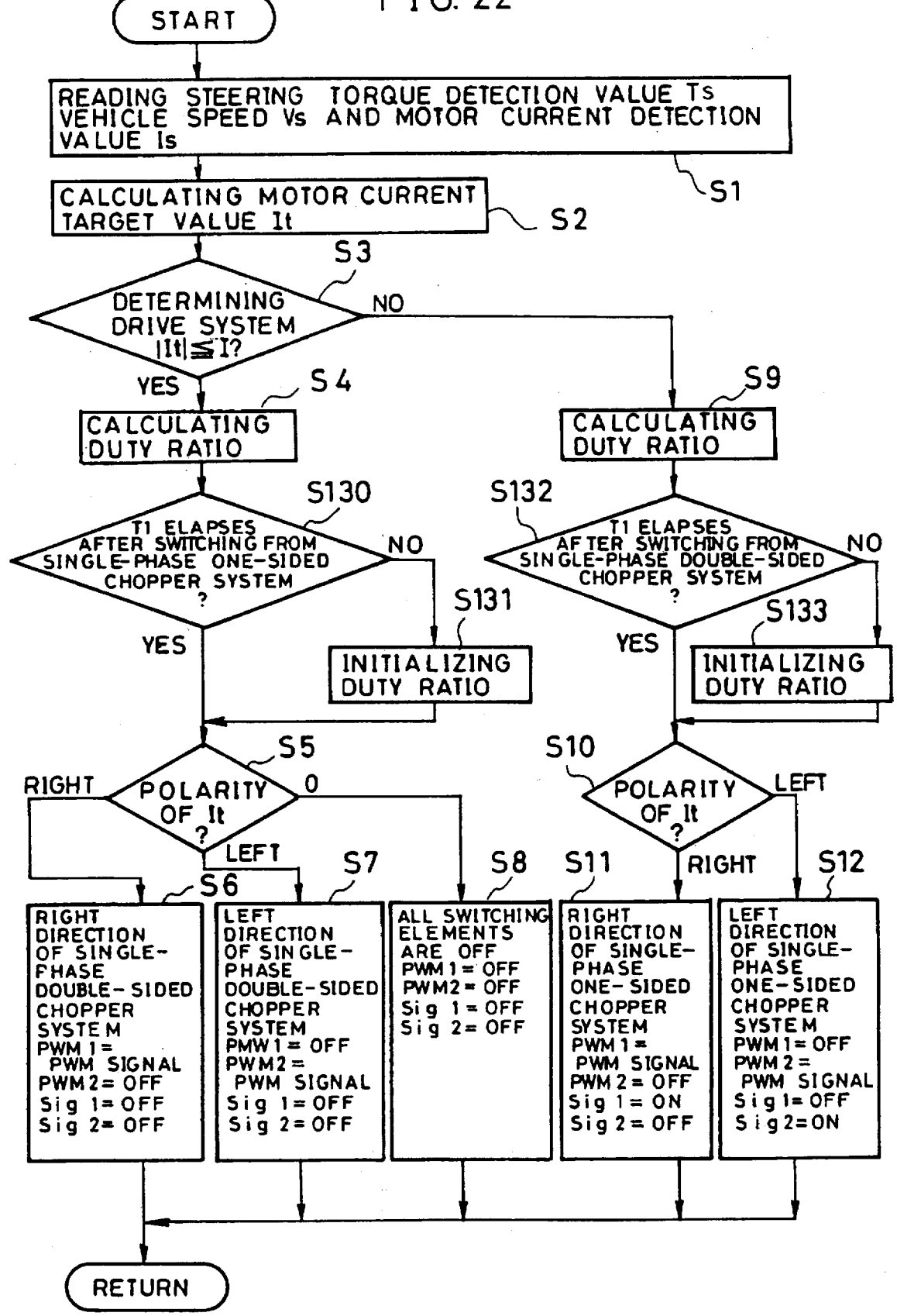
FIG. 22 is a flow chart showing the operation of Embodiment 12 of the present invention.

The control means 13 of Embodiment 1 may determine switching of a drive system after decision of a drive system to initialize the duty ratio as shown in FIG. 22.

A description is given of the operation of this control means 13 of this Embodiment 12 with reference to a flow chart shown in FIG. 22. Like Embodiment 1, a steering torque detection value Ts, a vehicle speed Vs and a motor current detection value Is are read in step S1, and a motor current target value It is calculated in the subsequent step S2. In step S3, drive system is determined such that, if the motor current target value It falls below a predetermined value I, the drive system of the bridge circuit 5 should be a single-phase double-sided chopper system, and, if the motor current target value It exceeds the predetermined value I, the drive system of the bridge circuit should be a single-phase one-sided chopper system.

If the drive system is determined to be a single-phase double-sided chopper system in step S3, a duty ratio is calculated in step S4. In this instance, if PID control is performed based on the motor current target value It and the motor current detection value Is, duty ratios after and before switching are almost equal.

Figure 27:
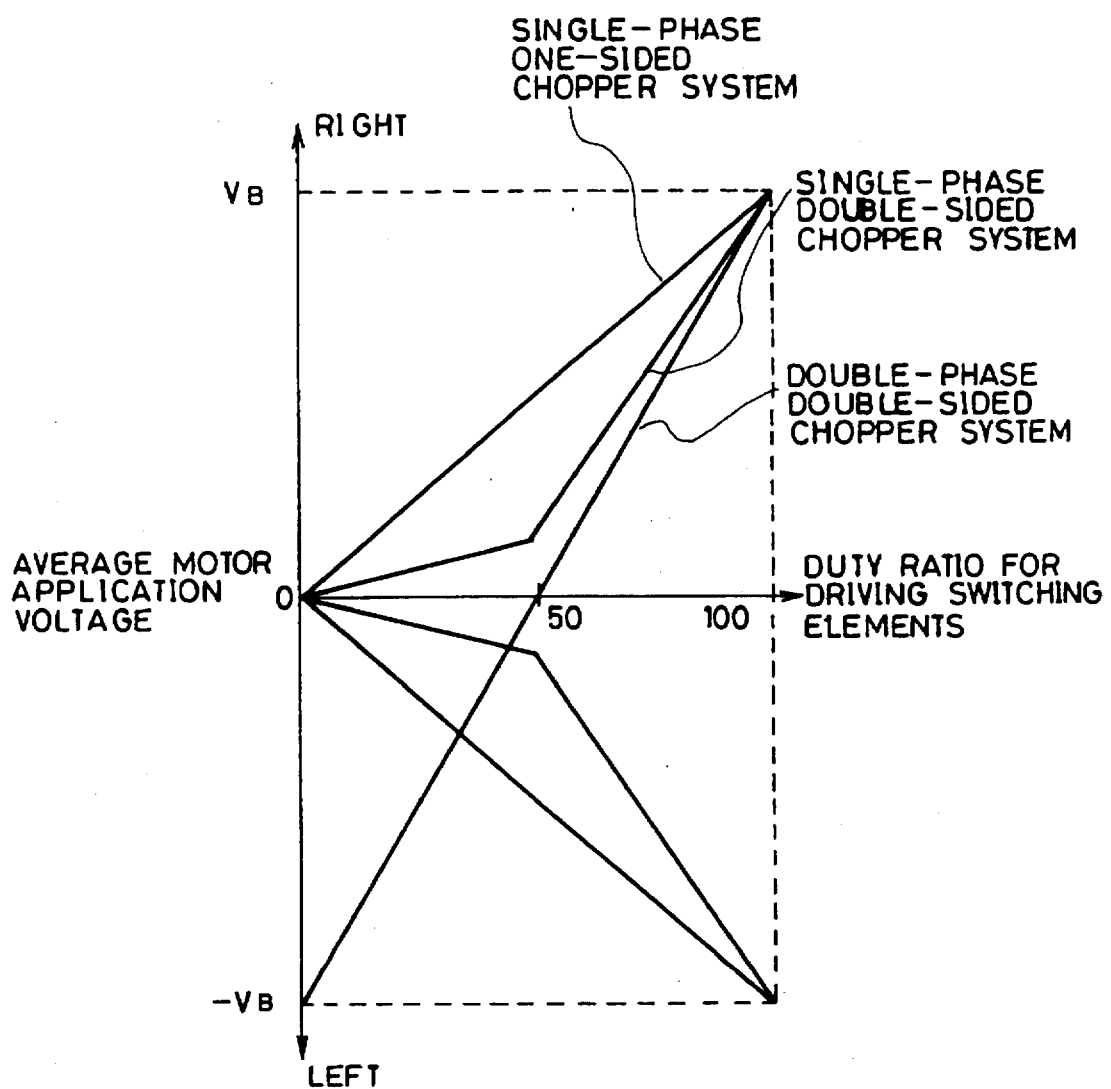
FIG. 27 is a diagram explaining the prior art.

However, as shown in FIG. 27, a single-phase double-sided chopper system and single-phase one-sided chopper system are different from each other in average motor application voltage with respect to the same duty ratio. When the switching elements 3a to 3d are driven with the same duty ratio upon switching of drive system, the torque and revolution speed of the motor 2 undergo big changes.

Then, in FIG. 27, attention is paid to the relationship between duty ratio and average motor application voltage in a single-phase double-sided chopper system and single-phase one-sided chopper system. The relationship between duty ratio duty1 of a single-phase one-sided chopper system and absolute value of average motor application voltage VM1 can be approximated by the following equation.

$$VM1=V_p\times duty1/100 \qquad (4)$$

The relationship between duty ratio duty2 of a single-phase double-sided chopper system and absolute value of average motor application voltage VM2 can be approximated by the following equation.

$$VM2=V_p\times(duty2-50)/50 \qquad (5)$$

Therefore, to switch a drive system from a single-phase one-sided chopper system to a single-phase double-sided chopper system in order to prevent changes in average motor application voltage, an initial value of duty2 upon switching should be set as follows by making VM1 equal to VM2 in the equations (4) and (5).

$$duty2=(\tfrac{1}{2})\times duty1+50 \qquad (6)$$

Similarly, when a drive system is switched from a single-phase double-sided chopper system to a single-phase one-sided chopper system, an initial value of duty1 upon switching should be set as follows.

$$duty1=2\times(duty2-50) \qquad (7)$$

In step S130, it is determined whether or not a predetermined time period T1 elapses from the time when a drive system is switched to the time when the integral term for motor control is integrated and a rapid change in average motor application voltage is eliminated. If it is determined that the predetermined time period T1 does not elapse, the duty ratio of a single-phase double-sided chopper system is initialized using the equation (6) in step S131. Thereafter, steps S6 to S8 are carried out sequentially. Since these steps are completely the same as in Embodiment 1, their descriptions are omitted.

If it is determined that the predetermined time period T1 elapses in step S130, the torque and revolution speed of the motor 2 do not undergo rapid changes because average motor application voltage does not change rapidly even when the switching elements 3a to 3d are driven with the duty ratio calculated in the previous step S4. Therefore, steps S5 to S8 are then carried out sequentially. Since these steps are completely the same as in Embodiment 1, their descriptions are omitted.

On the other hand, if a drive system is determined to be a single-phase one-sided chopper system in step S3, a duty ratio is calculated in step S9. After a drive system is switched from a single-phase double-sided chopper system to a single-phase one-sided chopper system, it is determined whether or not the predetermined time period T1 elapses in step S132.

If it is determined that the predetermined time period T1 does not elapse in step S132, the duty ratio of a single-phase one-sided chopper system is initialized using the equation (7) in step S133. Thereafter, steps S10 to S12 are carried out sequentially. Since these steps are completely the same as in Embodiment 1, their descriptions are omitted.

If it is determined that the predetermined time period T1 elapses in step S132, steps S10 to S12 are carried out sequentially. Since these steps are completely the same as in Embodiment 1, their descriptions are omitted.

Since average motor application voltage becomes almost constant upon switching of a drive system due to initialization in this Embodiment 12, rapid changes in the torque and revolution speed of the motor 2 can be alleviated.

When a drive system is switched between a double-phase double-sided chopper system and single-phase one-sided chopper system like Embodiment 2, the same effect can be obtained even if the duty ratio is initialized like this Embodiment 12.

In other words, as shown in FIG. 27, the relationship between the duty ratio duty3 of a double-phase double-sided chopper system and absolute value of average motor application voltage VM3 can be approximated by the following equation when the motor 2 is driven in a right direction.

$$VM3=V_p \times (duty3-50)/50 \tag{8}$$

The relationship can be approximated by the following equation when the motor 2 is driven in a left direction.

$$VM3=V_p \times (50 \times duty3)/50 \tag{9}$$

Therefore, to switch a drive system from a single-phase one-sided chopper system to a double-phase double-sided chopper system to eliminate rapid changes in the torque and revolution speed of the motor 2, an initial value of duty3 upon switching should be set as follows by making VM1 equal to VM3 in the equations (4), (8) and (9) when the motor 2 is driven in a right direction.

$$duty3=(\tfrac{1}{2}) \times duty1+50 \tag{10}$$

The initial value should be set as follows when the motor 2 is driven in a left direction.

$$duty3=-(\tfrac{1}{2}) \times duty1+50 \tag{11}$$

Similarly, to switch a drive system from a double-phase double-sided chopper system to a single-phase one-sided chopper system, an initial value of duty1 upon switching should be set as follows when the motor 2 is driven in a right direction.

$$duty1=2 \times (duty3-50) \tag{12}$$

The initial value should be set as follows when the motor 2 is driven in a left direction.

$$duty1=2 \times (50-duty3) \tag{13}$$

In other words, if a drive system is determined to be a double-phase double-sided chopper system in step S3, it is determined whether or not a predetermined time period T1 elapses after a drive system is switched from a single-phase one-sided chopper system to a double-phase double-sided chopper system. If it is determined that the predetermined time period T1 does not elapse, the duty ratio is initialized using the equations (10) and (11) in step S131.

On the other hand, if a drive system is determined to be a single-phase one-sided chopper system in step S3, it is determined whether or not the predetermined time period T1 elapses after a drive system is switched from a double-phase double-sided chopper system to a single-phase one-sided chopper system in step S132. If it is determined that the predetermined time period T1 does not elapse, the duty ratio is initialized using the equations (12) and (13) in step S133.

Since it is not necessary to turn off all the switching elements 3a to 3d, steps S6, S7, S11 and S12 are replaced by steps S21, S22, S23 and S24, respectively and step S8 is eliminated. Since steps other than the above steps are the completely the same as steps for initializing the duty ratio when a drive system is switched between a single-phase double-sided chopper system and single-phase one-sided chopper system, their descriptions are omitted. In either case, it is needless to say that a hysteresis element and a timer element may be added to decision on switching of drive system like Embodiments 8 and 9.

Embodiment 13

Figure 23:
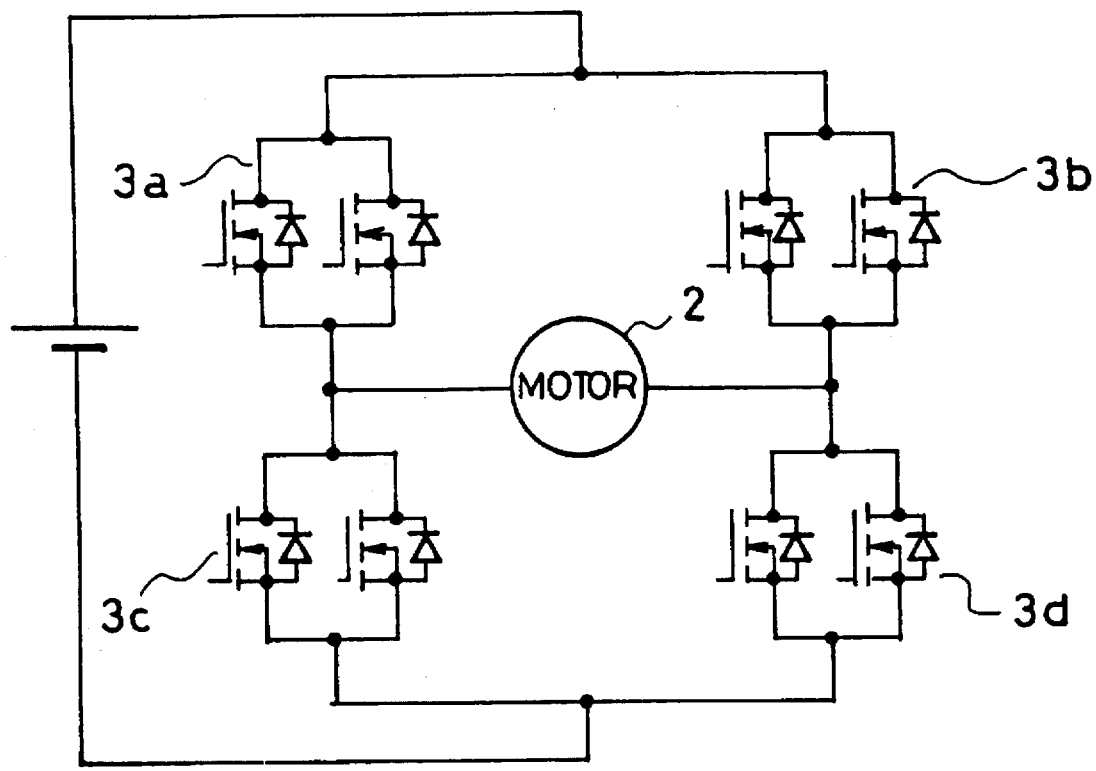
FIG. 23 is a circuit diagram showing the bridge circuit of Embodiment 13 of the present invention.
Figures 24A, 24B:
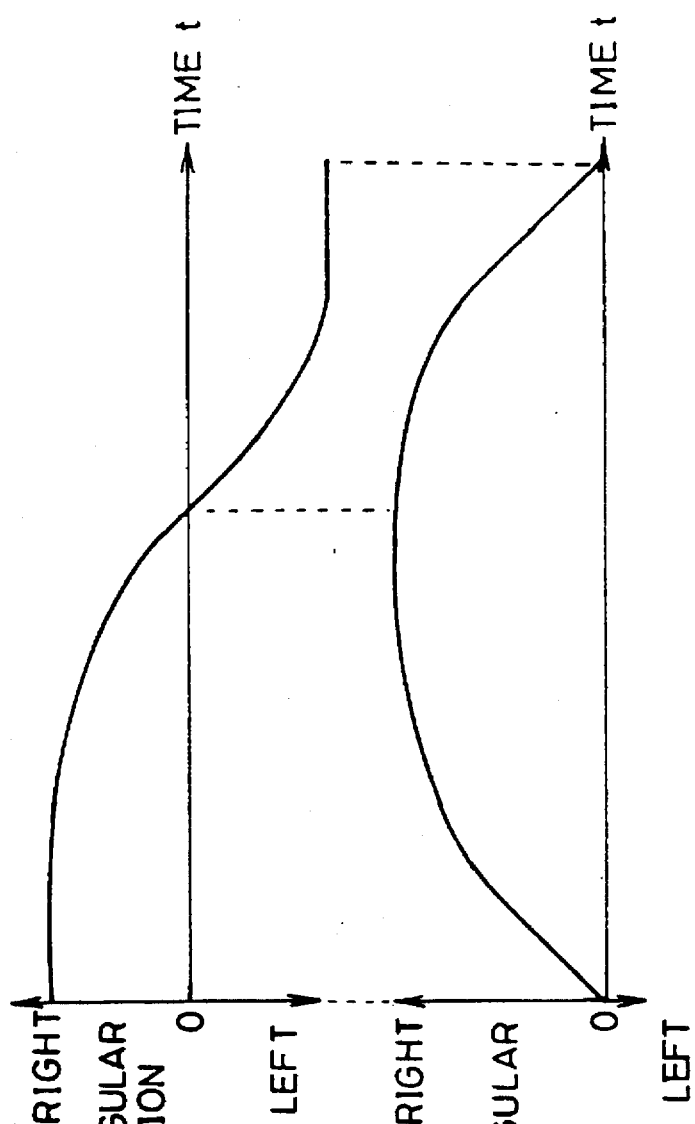
FIGS. 24A and B are timing charts for explaining the prior art.
Figures 25A, 25B:
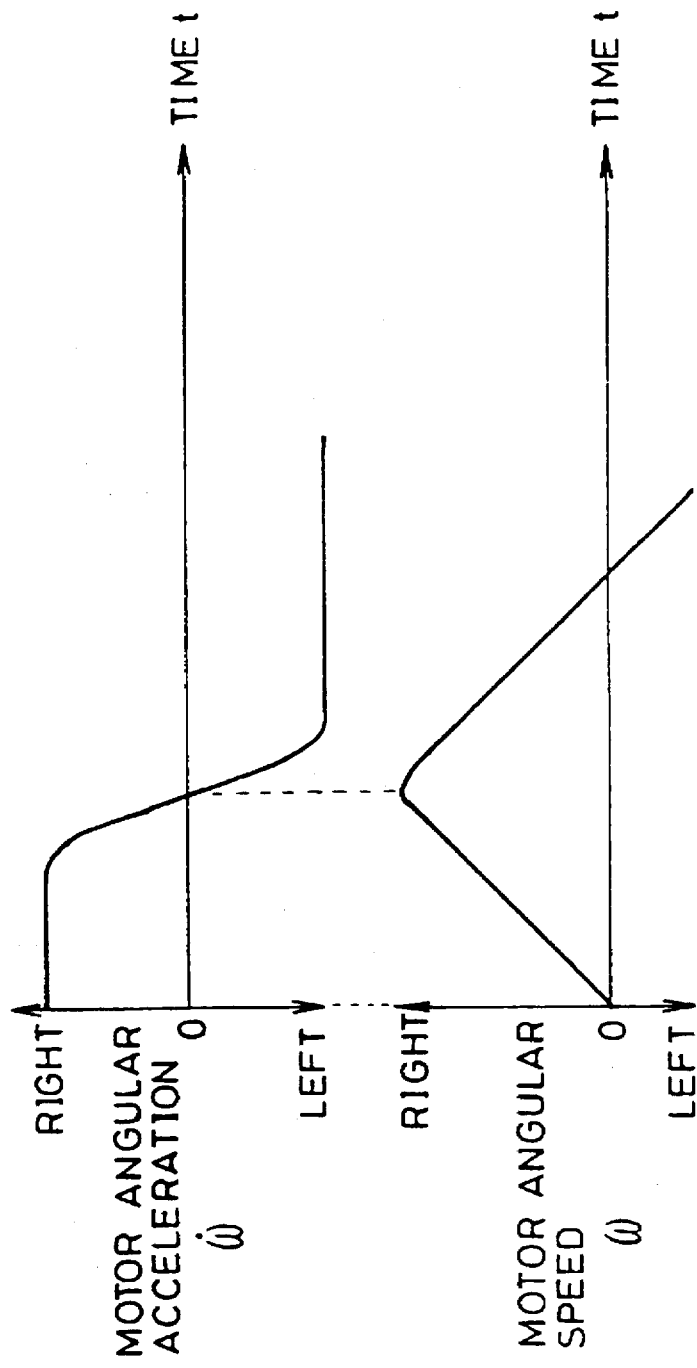
FIGS. 25A and B are timing charts for explaining the prior art.
Figures 26A, 26B:
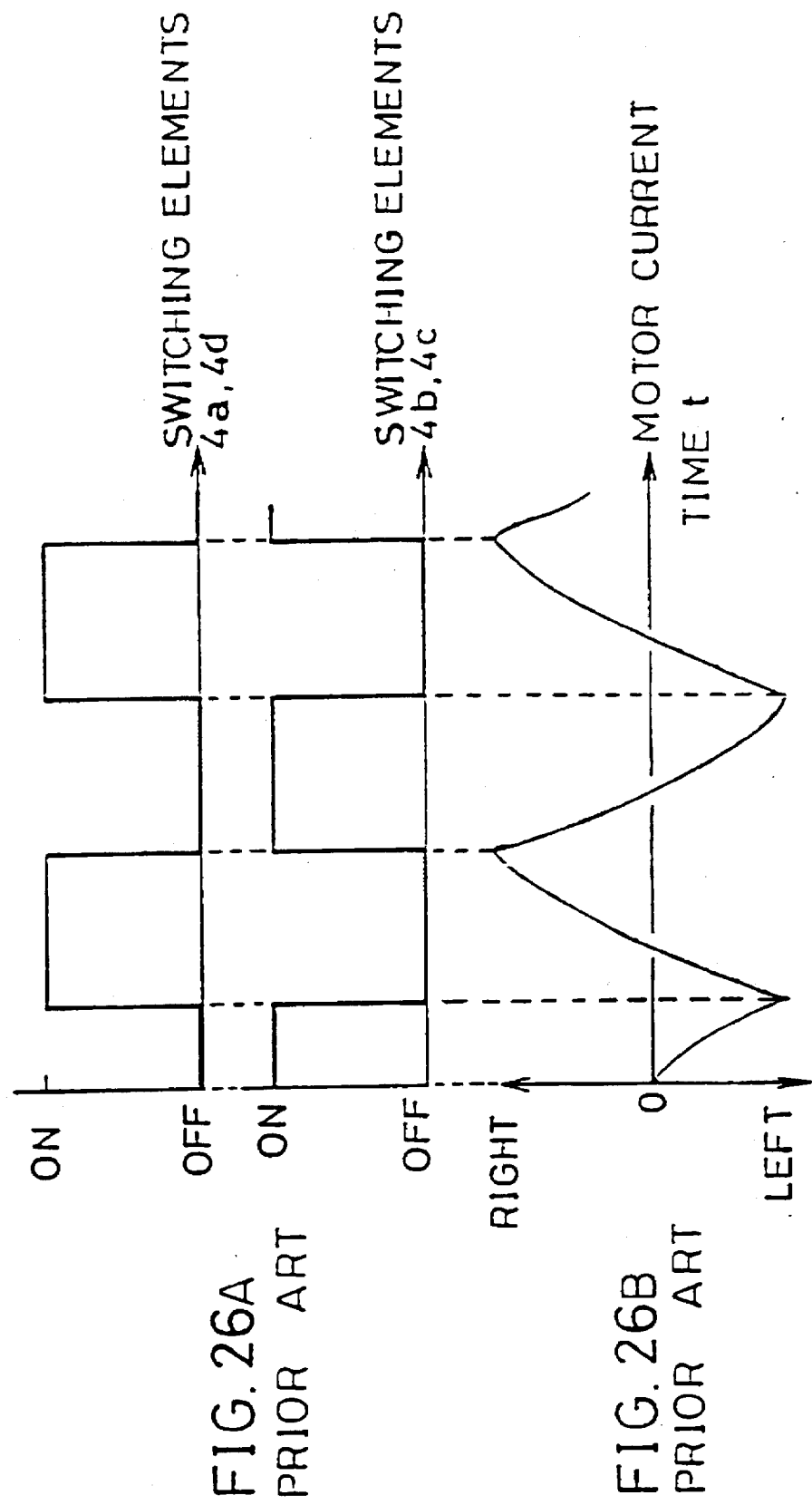
FIGS. 26A and B are timing charts for explaining the prior art.

Each of the above Embodiments where four switching elements 3a to 3d are used to construct the bridge circuit 5 has been described with reference to accompanying drawings. However, when a current which can be flown by the switching elements 3a and 3d is small, multiples of 4 of the switching elements 3a to 3d are connected in parallel as shown in FIG. 23 so that a large current can be flown by these switching elements.

According to this invention, the following effects can be obtained.

Since it is determined whether or not the result of detection by detection means or the amount of control calculated by control means falls below a predetermined value and drive system is switched between a single-phase one-sided chopper system and single-phase double-sided chopper system based on the result of the decision, control in an area suitable for each drive system is possible, thereby making it possible to make use of the advantage of each drive system, improve controllability in an area where duty ratio is small, and reduce heat generated from the switching elements in an area where duty ratio is large.

Also, since it is determined whether or not the result of detection by the detection unit or the amount of control calculated by the control unit falls below a predetermined value and drive system is switched between a single-phase one-sided chopper system and double-phase double-sided chopper system based on the result of the decision, control in an area suitable for each drive system is possible, thereby making it possible to make use of the advantage of each drive system, improve response when the motor is inverted, and reduce heat generated from the switching elements in an area where duty ratio is large.

Since it is determined whether or not the result of detection by the detection unit or the amount of control calculated by the control unit falls below a first predetermined value or a second predetermined value larger than the first predetermined value and drive system is switched among a single-phase one-sided chopper system, single-phase double-sided chopper system and double-phase double-sided chopper system based on the result of the decision, control in an area suitable for each drive system is possible, thereby making it possible to make use of the advantage of each drive system, improve response when the motor is inverted and controllability in an area where duty ratio is small, and reduce heat generated from the switching elements in an area where large duty ratio is large.

According to claim 4, since a hysteresis component is provided to the drive system switching condition to prevent frequent switching of drive system, the motor can be smoothly driven. For instance, when the present invention is applied to electric power steering, driving comfort upon switching of a drive system can be improved.

Also, since switching of a drive system is prohibited when a predetermined time period does not elapse after drive system is switched so as to prevent frequent switching of drive system, the motor can be smoothly driven. For instance, when the present invention is applied to electric power steering, driving comfort upon switching of a drive system can be improved.

Since gains for motor control are changed upon switching of a drive system, control in an area suitable for each drive system is possible, thereby making it possible to alleviate rapid changes in the torque of the motor upon switching of drive system and control the motor smoothly. For instance, when the present invention is applied to electric power steering, driving comfort upon switching of a drive system can be improved.

Control with an appropriate duty ratio can be made possible by initializing the integral term upon switching of a drive system, thereby making it possible to alleviate rapid changes in the torque of the motor upon switching of a drive system and drive the motor smoothly. For instance, when the present invention is applied to electric power steering, driving comfort upon switching of a drive system can be improved.

Control with an appropriate duty ratio can be made possible by setting an initial value of duty ratio upon switching of a drive system, thereby making it possible to suppress rapid changes in the torque of the motor upon switching of a drive system and drive the motor smoothly. For instance, when the present invention is applied to electric power steering, driving comfort upon switching of a drive system can be improved.

What is claimed is:

1. A motor controller comprising:
   a motor connected as a load to a bridge circuit formed of four switching elements;
   detection means for detecting various states of an apparatus; and
   control means for controlling said motor to a desired motor current by obtaining the amount of control based on the result of detection by said detection means and by operating two pairs of the switching elements of said bridge circuit based on the amount of control, wherein said control means comprises drive system switching means for switching a drive system between a single-phase double-sided chopper system in which one of the two pairs of switching elements is driven by a PWM drive signal in a desired direction of conduction and the other pair of switching elements is turned off when the result of detection or the amount of control falls below a predetermined value and a single-phase one-sided chopper system in which one switching element of one of the two pairs of switching elements is driven by a PWM drive signal in a desired direction of conduction, the other switching element of said one of the two pairs of switching elements is turned on continuously, and the other pair of switching elements is turned off when the result of detection or the amount of control exceeds the predetermined value.

2. The motor controller of claim 1, wherein a hysteresis component is provided to the drive system switching condition.

3. The motor controller of claim 1, wherein the drive system is switched only when a predetermined time elapses since the time when the drive system was switched previously.

4. The motor controller of claim 1, wherein gains for motor control are changed at the time of switching the drive system of the bridge circuit.

5. The motor controller of claim 1, wherein the amount of control is at least integrally controlled and an integral term is initialized at the time of switching the drive system of the bridge circuit.

6. The motor controller of claim 5, wherein an initial value of duty ratio for driving the switching elements is set at the time of switching the drive system of the bridge circuit.

7. A motor controller comprising:
   a motor connected as a load to a bridge circuit formed of four switching elements;
   detection means for detecting various states of an apparatus; and
   control means for controlling said motor to a desired motor current by obtaining the amount of control based on the result of detection by said detection means and by operating two pairs of the switching elements of said bridge circuit based on the amount of control, wherein said control means comprises drive system switching means for switching a drive system between a double-phase double-sided chopper system in which one of the two pairs of switching elements is driven by a PWM drive signal in a desired direction of conduction and the other pair of switching elements is driven by an inverted signal of the drive signal when the result of detection or the amount of control falls below a predetermined value and a single-phase one-sided chopper system in which one switching element of one of the two pairs of switching elements is driven by a PWM drive signal in a desired direction of conduction, the other switching element of said one of the two pairs of switching elements is turned on continuously, and the other pair of switching elements is turned off when the result of detection or the amount of control exceeds the predetermined value.

8. A motor controller comprising:
   a motor connected as a load to a bridge circuit formed of four switching elements;
   detection means for detecting various states of an apparatus; and control means for controlling said motor to a desired motor current by obtaining the amount of control based on the result of detection by said detection means and by operating two pairs of the switching elements of said bridge circuit based on the amount of control, wherein said control means comprises drive system switching means for switching a drive system among a double-phase double-sided chopper system in which one of the two pairs of switching elements is driven by a PWM drive signal in a desired direction of conduction and the other pair of switching elements is driven by an inverted signal of the drive signal when the result of detection or the amount of control falls below a first predetermined value, a single-phase double-sided chopper system in which one switching element of one of the two pairs of switching elements is driven by a PWM drive signal in a desired direction of conduction and the other pair of switching elements is turned off when the result of detection or the amount of control exceeds the first predetermined value and falls below a second predetermined value greater than the first predetermined value, and a single-phase one-sided chopper system in which one switching element of one of the pairs of switching elements is driven by a PWM drive signal in a desired direction of conduction, the other switching element of said one of the pairs of switching elements is turned on continuously, and the other pair of switching elements is turned off when the result of detection or the amount of control exceeds the second predetermined value.

* * * * *